United States Patent
Gupta et al.

(10) Patent No.: US 8,644,808 B2
(45) Date of Patent: Feb. 4, 2014

(54) SYSTEM FOR PROVIDING MOBILE ADVERTISEMENT ACTIONS

(75) Inventors: Arvind Gupta, San Carlos, CA (US); Ashutosh Tiwari, Studio City, CA (US); Gopalakrishnan Venkatraman, Campbell, CA (US); Dominic Cheung, South Pasadena, CA (US); Stacy R. Bennett, Pasadena, CA (US); Douglas B. Koen, Austin, TX (US)

(73) Assignee: Yahoo! Inc., Sunnyvale, CA (US)

( * ) Notice: Subject to any disclaimer, the term of this patent is extended or adjusted under 35 U.S.C. 154(b) by 768 days.

(21) Appl. No.: 12/059,460

(22) Filed: Mar. 31, 2008

(65) Prior Publication Data

US 2009/0247140 A1   Oct. 1, 2009

(51) Int. Cl.
*H04L 29/08* (2006.01)

(52) U.S. Cl.
USPC ......... 455/414.3; 455/414.2; 455/456.3; 705/14.58; 705/14.63

(58) Field of Classification Search
USPC ......... 705/14.58, 14.63, 26; 455/414.2, 456.3
See application file for complete search history.

(56) References Cited

U.S. PATENT DOCUMENTS

| | | | |
|---|---|---|---|
| 6,009,409 A | 12/1999 | Adler et al. ............... 705/14 |
| 6,026,368 A | 2/2000 | Brown et al. ............... 705/14 |
| 6,047,310 A | 4/2000 | Kamakura et al. | |
| 6,199,045 B1 | 3/2001 | Giniger et al. ............... 705/1 |
| 6,205,193 B1 | 3/2001 | Solve et al. | |
| 6,298,330 B1 | 10/2001 | Gardenswartz et al. | |
| 6,334,108 B1 | 12/2001 | Deaton et al. | |
| 6,343,317 B1 | 1/2002 | Glorikian ............... 709/217 |
| 6,377,793 B1 | 4/2002 | Jenkins ............... 455/456 |

(Continued)

FOREIGN PATENT DOCUMENTS

| | | |
|---|---|---|
| JP | 1996-172495 A | 7/1996 |
| JP | 8172495 | 7/1996 |

(Continued)

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth #108, Oct. 23-25, 2007, 2 pages. Retrieved from http://www.smaato.com/download/pressarea/Smaato_CTIA_20071022_release.pdf.

(Continued)

*Primary Examiner* — Ajit Patel
*Assistant Examiner* — Julio Perez
(74) *Attorney, Agent, or Firm* — Brinks Gilson & Lione

(57) ABSTRACT

A system for providing mobile advertisement actions may include a memory to store a request, mobile carrier data, mobile advertisement data, and mobile advertisement action data. The system may include an interface operatively connected to the memory to communicate with a mobile device. The system may include a processor operatively connected to the memory and the interface. The processor may receive information and a request from the mobile device via the interface and may determine the mobile carrier data relating to a mobile carrier associated with the mobile device. The processor may identify the mobile advertisement data and the mobile advertisement action targeted to the request and the mobile carrier data. The processor may append the mobile advertisement action data to the mobile advertisement data. The processor may provide the mobile advertisement data with the appended mobile advertisement action data to the mobile device via the interface.

14 Claims, 11 Drawing Sheets

(56) References Cited

U.S. PATENT DOCUMENTS

| | | | |
|---|---|---|---|
| 6,381,465 B1 | 4/2002 | Chern et al. | |
| 6,401,075 B1 | 6/2002 | Mason et al. | 705/14 |
| 6,480,713 B2 | 11/2002 | Jenkins | 455/456 |
| 6,510,515 B1 | 1/2003 | Raith | |
| 6,654,725 B1 | 11/2003 | Langheinrich et al. | 705/14 |
| 6,681,107 B2 | 1/2004 | Jenkins et al. | 455/412.1 |
| 6,714,975 B1 | 3/2004 | Aggarwal et al. | 709/224 |
| 6,795,710 B1 | 9/2004 | Creemer | |
| 6,822,663 B2 | 11/2004 | Wang et al. | |
| 6,826,572 B2 | 11/2004 | Colace et al. | 707/10 |
| 6,907,566 B1 | 6/2005 | McElfresh et al. | 715/517 |
| 6,928,615 B1 | 8/2005 | Haitsuka et al. | 345/340 |
| 6,968,175 B2* | 11/2005 | Raivisto et al. | 455/406 |
| 6,985,742 B1 | 1/2006 | Giniger et al. | 455/414.3 |
| 7,043,483 B2 | 5/2006 | Colace et al. | 707/3 |
| 7,120,235 B2 | 10/2006 | Altberg et al. | |
| 7,136,661 B2 | 11/2006 | Graske et al. | |
| 7,200,853 B2 | 4/2007 | Kawai | |
| 7,277,718 B2 | 10/2007 | Wong | |
| 7,283,974 B2 | 10/2007 | Katz et al. | |
| 7,363,024 B2 | 4/2008 | Jenkins | 455/412.1 |
| 7,487,112 B2 | 2/2009 | Barnes, Jr. | |
| 7,593,721 B2 | 9/2009 | Ratnakar | |
| 7,606,918 B2 | 10/2009 | Holzman et al. | |
| 7,657,520 B2 | 2/2010 | Chen et al. | |
| 7,660,581 B2 | 2/2010 | Ramer et al. | |
| 7,729,945 B1 | 6/2010 | Katz et al. | |
| 7,801,892 B2 | 9/2010 | Lee et al. | |
| 2002/0010759 A1 | 1/2002 | Hitson et al. | |
| 2002/0046259 A1 | 4/2002 | Glorikian | 709/203 |
| 2002/0073034 A1 | 6/2002 | Wagner et al. | 705/51 |
| 2002/0077897 A1* | 6/2002 | Zellner et al. | 705/14 |
| 2002/0078101 A1 | 6/2002 | Chang et al. | 707/516 |
| 2002/0083441 A1 | 6/2002 | Flickinger et al. | |
| 2002/0083442 A1 | 6/2002 | Eldering | |
| 2002/0128908 A1 | 9/2002 | Levin et al. | |
| 2002/0129137 A1 | 9/2002 | Mills et al. | |
| 2002/0161791 A1 | 10/2002 | Hanhikoski | |
| 2002/0164004 A1 | 11/2002 | Tamura et al. | |
| 2003/0046161 A1 | 3/2003 | Kamangar et al. | 705/14 |
| 2003/0055725 A1 | 3/2003 | Lee | |
| 2003/0149938 A1 | 8/2003 | McElfresh et al. | 715/517 |
| 2003/0154446 A1 | 8/2003 | Constant et al. | |
| 2004/0039733 A1 | 2/2004 | Soulanille | 707/3 |
| 2004/0044571 A1 | 3/2004 | Bronnimann et al. | |
| 2004/0054576 A1 | 3/2004 | Kanerva et al. | 709/206 |
| 2004/0088212 A1 | 5/2004 | Hill | |
| 2004/0093327 A1 | 5/2004 | Anderson et al. | 707/1 |
| 2004/0186776 A1 | 9/2004 | Llach | 709/200 |
| 2004/0194130 A1 | 9/2004 | Konig et al. | |
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2005/0228797 A1 | 10/2005 | Koningstein et al. | |
| 2005/0289113 A1 | 12/2005 | Bookstaff | |
| 2006/0004627 A1* | 1/2006 | Baluja | 705/14 |
| 2006/0026069 A1 | 2/2006 | Mazurkiewicz et al. | |
| 2006/0041638 A1 | 2/2006 | Whittaker et al. | |
| 2006/0085419 A1 | 4/2006 | Rosen et al. | 705/1 |
| 2006/0100928 A1 | 5/2006 | Walczak, Jr. et al. | |
| 2006/0116926 A1 | 6/2006 | Chen | |
| 2006/0149630 A1 | 7/2006 | Elliott et al. | 705/14 |
| 2006/0172697 A1 | 8/2006 | Gallego et al. | 455/522 |
| 2006/0184512 A1 | 8/2006 | Kohanim et al. | |
| 2006/0194572 A1 | 8/2006 | Fresonke et al. | 455/414.1 |
| 2006/0194595 A1 | 8/2006 | Myllynen et al. | 455/412.2 |
| 2006/0242013 A1 | 10/2006 | Agarwal et al. | |
| 2006/0271524 A1 | 11/2006 | Tanne et al. | |
| 2006/0282408 A1 | 12/2006 | Wisely et al. | |
| 2006/0288000 A1 | 12/2006 | Gupta | |
| 2007/0018952 A1 | 1/2007 | Arseneau et al. | |
| 2007/0027852 A1 | 2/2007 | Howard et al. | |
| 2007/0042754 A1 | 2/2007 | Bajikar et al. | |
| 2007/0061334 A1 | 3/2007 | Ramer et al. | |
| 2007/0088801 A1 | 4/2007 | Levkovitz et al. | |
| 2007/0112739 A1 | 5/2007 | Burns et al. | |
| 2007/0121846 A1 | 5/2007 | Altberg et al. | |
| 2007/0174258 A1 | 7/2007 | Jones et al. | |
| 2007/0174490 A1 | 7/2007 | Choi et al. | 709/246 |
| 2007/0192318 A1 | 8/2007 | Ramer et al. | |
| 2007/0198339 A1 | 8/2007 | Shen et al. | |
| 2007/0213069 A1 | 9/2007 | Ji et al. | |
| 2007/0214043 A1 | 9/2007 | Yasuda | |
| 2007/0214048 A1 | 9/2007 | Chan et al. | |
| 2007/0233565 A1 | 10/2007 | Herzog et al. | |
| 2007/0233566 A1 | 10/2007 | Zlotin et al. | |
| 2007/0264987 A1 | 11/2007 | Gupta et al. | |
| 2007/0288318 A1 | 12/2007 | Gupta et al. | |
| 2007/0294725 A1 | 12/2007 | Cohen et al. | |
| 2008/0032703 A1 | 2/2008 | Krumm et al. | |
| 2008/0221983 A1 | 9/2008 | Ausiannik et al. | |
| 2008/0256050 A1 | 10/2008 | Zhang et al. | |
| 2009/0049090 A1 | 2/2009 | Shenfield et al. | |

FOREIGN PATENT DOCUMENTS

| | | |
|---|---|---|
| JP | 2008-558303 | 12/2000 |
| JP | 2004-038367 A | 2/2004 |
| JP | 2005-251021 | 9/2005 |
| JP | 2005-300806 | 10/2005 |
| JP | 2008-558303 | 2/2006 |
| KR | 10-2000-0036964 A | 7/2000 |
| KR | 10-2001-0090958 | 10/2001 |
| KR | 10-2001-0097071 A | 11/2001 |
| KR | 10-2001-0102668 A | 11/2001 |
| KR | 10-2002-0000289 A | 1/2002 |
| KR | 10-2002-0065806 A | 8/2002 |
| KR | 2003-0026446 A | 4/2003 |
| KR | 10-2004-0099223 A | 11/2004 |
| KR | 10-2005-0097155 A | 10/2005 |
| KR | 2006-0004579 A | 1/2006 |
| KR | 2006-0028515 A | 3/2006 |
| KR | 2006-0062360 A | 6/2006 |
| KR | 10-2006-0127318 A | 12/2006 |
| KR | 10-0757757 B1 | 9/2007 |

OTHER PUBLICATIONS

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"ESME," *Wikipedia, the free encyclopedia*, p. 1, http://en.wikipedia.org/wiki/ESME, last modified Dec. 20, 2006, last visited Oct. 9, 2007.

"Network Switching Subsystem," *Wikipedia, the free encyclopedia*, pp. 1-6, http://en.wikipedia.org/wiki/Network_Switching_Subsystem, last modified Oct. 9, 2007, last visited Oct. 9, 2007.

"Short message service," *Wikipedia, the free encyclopedia*, pp. 1-5, http://en.wikipedia.org/wiki/Short_message_service, last modified Oct. 9, 2007, last visited Oct. 9, 2007.

"Short message service center," *Wikipedia, the free encyclopedia*, pp. 1-2, http://en.wikipedia.org/wiki/Short_message_service_center, last modified Sep. 11, 2007, last visited Oct. 9, 2007.

"Signal Transfer Point," *Wikipedia, the free encyclopedia*, p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lodown," *Adweek*, pp. 1-2, http://www.adweek.com/aw/iq_interactive/article_display.jsp?vnu_content_id=1003665626, dated Oct. 31, 2007, last visited Apr. 1, 2008.

(56) References Cited

OTHER PUBLICATIONS

Japanese Blog, printed from the internet at <http://halhal777.blog3.fc2.com/blog-entry-94.html> on Apr. 24, 2009, 12 pages.
Japanese Blog, printed from the internet at <http://k.hatena.ne.jp/keywordblog/jmobi> on Apr. 24, 2009, 3 pages.
Japanese Blog, printed from the internet at <http://blog.livedoor.jp/junpaku/archives/16328274.html on Apr. 24> 2009, 4 pages.
Japanese Blog, printed from the internet at <http://netanetaneta.seesaa.net/> on Apr. 24, 2009, 10 pages.
Japanese Blog, printed from the internet at <http://www.rc-seo.jp/000027.html> on Apr. 24, 2009, 2 pages.
Japanese Blog, printed from the internet at <http://www.cottonwool.jp/labo/jmobi.html> on Apr. 24, 2009, 3 pages.
Japanese Blog, printed from the internet at <http://www.googleadsense.seesaa.net/article/2238902.html> on Apr. 24, 2009, 3 pages.
Japanese Blog, printed from the internet at <http://vanillachips.net/archives/20050309_2336.php> on Apr. 24, 2009, 4 pages.
"Internet White Paper 2006," *Internet White Paper*, R&D, Tokyo, Japan, Jun. 21, 2006, 15 pages.
International Search Report and Written Opinion dated Aug. 16, 2007 for corresponding PCT Application No. PCT/US2007/005217, 9 pages.
International Search Report and Written Opinion of the International Searching Authority dated Jul. 27, 2009 for corresponding International Application No. PCT/US2009/030196, 7 pages.
International Search Report and Written Opinion of the International Searching Authority dated Jul. 31, 2009 for corresponding International Application No. PCT/US2009/035657, 7 pages.
International Search Report and Written Opinion of the International Searching Authority dated Aug. 31, 2009 for corresponding International Application No. PCT/US2009/035662, 9 pages.
International Search Report and Written Opinion of the International Searching Authority dated Feb. 17, 2010 for corresponding International Application No. PCT/US2009/049227, 8 pages.
International Search Report and Written Opinion of the International Searching Authority dated Feb. 18, 2009 for corresponding International Application No. PCT/US2008/067099, 7 pages.
International Search Report and Written Opinion of the International Searching Authority dated Jun. 30, 2009 for corresponding International Application No. PCT/US2008/084163, 7 pages.
International Search Report and Written Opinion of the International Searching Authority dated Jun. 24, 2009 for corresponding International Application No. PCT/US2008/084172, 7 pages.
International Search Report and Written Opinion of the International Searching Authority dated Jun. 24, 2009 for corresponding International Application No. PCT/US2008/084338, 8 pages.
International Preliminary Report on Patentability dated Sep. 9, 2008 for corresponding International Application No. PCT/US2007/005217, 6 pages.
International Preliminary Report on Patentability dated Jan. 12, 2010 for corresponding International Application No. PCT/US2008/067099, 5 pages.
International Preliminary Report on Patentability dated Jun. 22, 2010 for corresponding International Application No. PCT/US2008/084163, 5 pages.
International Preliminary Report on Patentability dated Jun. 22, 2010 for corresponding International Application No. PCT/US2008/084172, 5 pages.
International Preliminary Report on Patentability dated Jun. 22, 2010 for corresponding International Application No. PCT/US2008/084338, 6 pages.
STIC Search Report EIC 3600 dated Feb. 5, 2010; for U.S. Appl. No. 11/830,194, 86 pages.
Advisory Action mailed Aug. 3, 2010 for U.S. Appl. No. 11/712,276, 3 pages.
Supplemental Final Office Action mailed Apr. 30, 2010 for U.S. Appl. No. 11/712,276, 15 pages.
Final Office Action mailed Mar. 5, 2010 for U.S. Appl. No. 11/712,276, 13 pages.
Office Action mailed Sep. 10, 2009 for U.S. Appl. No. 11/712,276, 12 pages.
Final Office Action mailed Aug. 23, 2010 for U.S. Appl. No. 11/776,073, 17 pages.
Office Action mailed Apr. 30, 2010 for U.S. Appl. No. 11/776,073, 14 pages.
Office Action mailed Dec. 29, 2009 for U.S. Appl. No. 11/776,073, 13 pages.
Advisory Action mailed Aug. 10, 2010 for U.S. Appl. No. 11/776,081, 3 pages.
Final Office Action mailed Apr. 29, 2010 for U.S. Appl. No. 11/776,081, 13 pages.
Office Action mailed Dec. 22, 2009 for U.S. Appl. No. 11/776,081, 9 pages.
Notice of Allowance mailed Feb. 17, 2010 for U.S. Appl. No. 11/830,194, 12 pages.
Office Action mailed Sep. 4, 2009 for U.S. Appl. No. 11/830,194, 14 pages.
Advisory Action mailed May 3, 2010 for U.S. Appl. No. 11/830,344, 3 pages.
Final Office Action mailed Feb. 24, 2010 for U.S. Appl. No. 11/830,344, 15 pages.
Office Action mailed Sep. 11, 2009 for U.S. Appl. No. 11/830,344, 15 pages.
Advisory Action mailed May 27, 2010 for U.S. Appl. No. 11/830,406, 3 pages.
Final Office Action mailed Mar. 23, 2010 for U.S. Appl. No. 11/830,406, 14 pages.
Office Action mailed Sep. 14, 2009 for U.S. Appl. No. 11/830,406, 15 pages.
Examiner's Answer to Appeal Brief mailed Aug. 4, 2010 for U.S. Appl. No. 11/830,431, 11 pages.
Advisory Action mailed Apr. 16, 2010 for U.S. Appl. No. 11/830,431, 3 pages.
Final Office Action mailed Feb. 12, 2010 for U.S. Appl. No. 11/830,431, 11 pages.
Office Action mailed Sep. 9, 2009 for U.S. Appl. No. 11/830,431, 11 pages.
Office Action mailed Jun. 10, 2010 for U.S. Appl. No. 11/963,154, 11 pages.
Office Action mailed May 4, 2010 for U.S. Appl. No. 12/165,175, 21 pages.
Office Action mailed Aug. 20, 2010 for U.S. Appl. No. 12/026,522, 18 pages.
Examiner's Answer to Appeal Brief mailed Jan. 18, 2011 for U.S. Appl. No. 11/712,276, 16 pages.
International Preliminary Report on Patentability dated Feb. 1, 2011 for corresponding International Application No. PCT/US2009/049227, 7 pages.
Office Action mailed Feb. 16, 2011 for U.S. Appl. No. 12/059,421, 12 pages.
Final Office Action mailed Feb. 16, 2011 for U.S. Appl. No. 11/830,307, 17 pages.
Final Office Action mailed Feb. 17, 2011 for U.S. Appl. No. 12/026,522, 23 pages.
Final Office Action mailed Apr. 13, 2011 for U.S. Appl. No. 11/963,082, 13 pages.
Advisory Action mailed Feb. 14, 2011 for U.S. Appl. No. 11/963,154, 3 pages.
Examiner's Answer to Appeal Brief mailed Aug. 30, 2010 for U.S. Appl. No. 11/830,344, 16 pages.
Examiner's Answer to Appeal Brief mailed Oct. 21, 2010 for U.S. Appl. No. 11/830,406, 22 pages.
Final Office Action mailed Feb. 2, 2011 for U.S. Appl. No. 11/830,230, 18 pages.
Final Office Action mailed Feb. 3, 2011 for U.S. Appl. No. 11/963,029, 13 pages.
Final Office Action mailed Nov. 23, 2010 for U.S. Appl. No. 11/963,154, 19 pages.
Final Office Action mailed Sep. 7, 2010 for U.S. Appl. No. 12/165,175, 18 pages.

(56) References Cited

OTHER PUBLICATIONS

International Preliminary Report on Patentability dated Aug. 10, 2010 for corresponding International Application No. PCT/US2009/030196, 6 pages.
International Preliminary Report on Patentability dated Oct. 5, 2010 for corresponding International Application No. PCT/US2009/035657, 6 pages.
International Preliminary Report on Patentability dated Oct. 5, 2010 for corresponding International Application No. PCT/US2009/035662, 8 pages.
Notice of Allowance mailed Oct. 21, 2010 for U.S. Appl. No. 11/830,194, 9 pages.
Office Action dated Jul. 28, 2010 for corresponding Korean Application No. 10-2008-7021632, 11 pages.
Office Action mailed Dec. 10, 2010 for U.S. Appl. No. 11/963,082, 13 pages.
Office Action mailed Jan. 21, 2011 for U.S. Appl. No. 12/180,782, 11 pages.
Office Action mailed Nov. 3, 2010 for U.S. Appl. No. 11/830,307, 17 pages.
Office Action mailed Oct. 20, 2010 for U.S. Appl. No. 11/963,029, 14 pages.
Office Action mailed Oct. 21, 2010 for U.S. Appl. No. 11/830,230, 19 pages.
"Mobile Search Engines White Paper," Sonera MediaLab, 2002, 13 pages.
European Search Report dated Aug. 10, 2011 for corresponding European Application No. 7751948.6, 6 pages.
Final Office Action dated Jun. 21, 2011 for U.S. Appl. No. 12/059,421, 12 pages.
Final Office Action dated Jul. 6, 2011 for U.S. Appl. No. 12/180,782, 14 pages.
Final Office Action dated Nov. 3, 2011 for U.S. Appl. No. 12/059,386, 14 pages.
Final Office Action dated Nov. 23, 2011 for U.S. Appl. No. 12/059,325, 11 pages.
Office Action dated Jun. 28, 2011 for U.S. Appl. No. 12/059,386, 23 pages.
Office Action dated Aug. 15, 2011 for U.S. Appl. No. 12/059,325, 21 pages.
Office Action dated Sep. 23, 2011 for U.S. Appl. No. 11/963,154, 22 pages.
Office Action dated Sep. 28, 2011 for U.S. Appl. No. 12/975,041, 16 pages.
Office Action dated Dec. 29, 2011 for U.S. Appl. No. 11/830,230, 15 pages.
Office Action dated May 17, 2011 for corresponding Australian Application No. 2009232311.0, 3 pages.
Office Action dated Jan. 10, 2011 for corresponding Chinese Application No. 200780008231.5, 10 pages.
Office Action dated Jul. 13, 2011 for corresponding Chinese Application No. 200980103451.5, 11 pages.
Office Action dated Aug. 8, 2011 for corresponding Chinese Application No. 200880122228.0, 12 pages.
Office Action dated Oct. 3, 2011 for corresponding Japanese Application No. 2008-558303, 8 pages.
Office Action dated Aug. 30, 2011 for corresponding Korean Application No. 10-2010-7016222, 7 pages.
Office Action dated Sep. 16, 2011 for corresponding Korean Application No. 10-2010-7017411, 5 pages.

* cited by examiner

SYSTEM FOR PROVIDING MOBILE ADVERTISEMENT ACTIONS

TECHNICAL FIELD

The present description relates generally to a system and method for providing mobile advertisement actions, and more particularly, but not exclusively, to providing mobile advertisement actions with a mobile advertisement to a user on a mobile device.

BACKGROUND

The mobile phone is increasingly more important as an information and content access device. Currently there may be twice as many mobile communication devices as personal computers. Mobile operators are increasingly looking to high value data services as a way to overcome the continuing decline in average per user voice revenue. Billions of dollars are being spent globally on wireless licenses with billions more in investments in the pipeline for development of infrastructure and services by wireless service and content providers. Carriers may be introducing new data, content and multimedia services as a means of generating new revenue streams, reversing negative ARPU trends, retaining and attracting customers as well as increasing returns on investment, and extending and differentiating their service offering to consumers. The emergence of these wireless technologies create unique opportunities for wireless carriers, advertisers and publishers to generate additional revenue streams through new and existing customers. As consumer adoption of wireless technology continues to increase, marketing via mobile devices becomes an important part of all integrated data communications strategies.

However, usage patterns for mobile search and Web search may differ, as well as the expectations of the users and the advertisers. Combined with a completely different user experience, these may change the value of clicks and lead opportunities. Current mobile devices may have limited browser capabilities that do not support the rich feature set of the Web. Handset capabilities may impact the search behavior of mobile users, where the limitations of numeric-pad keyed entry narrow the searched for terms. The small screen size on mobile devices may have an impact on the performance of the search implementations. The size of screens on mobile handsets may limit the output that may be displayed per listing, and the number of listings per screen. The absence of a mouse or joystick increases the time necessary for a mobile user to browse a webpage and click on links. Network broadcast speeds and bandwidths may limit the amount of data that a user receives at a time. Additionally, mobile users travel with their mobile devices and may need to obtain information much quicker than Web users. Current online marketing systems may not account for differences between mobile handsets and computers.

SUMMARY

A system is disclosed for providing mobile advertisement actions. The system receives a request from a mobile device. The system then identifies an advertisement targeted to the request where the advertisement includes at least one mobile advertisement action. The system then communicates the advertisement and the at least one mobile advertisement action to the mobile device.

The system for providing mobile advertisement actions may include a memory to store a request, mobile carrier data, mobile advertisement data, and mobile advertisement action data. The system may include an interface operatively connected to the memory to communicate with a mobile device. The system may include a processor operatively connected to the memory and the interface. The processor may receive information and a request from the mobile device via the interface and may determine the mobile carrier data relating to a mobile carrier associated with the mobile device. The processor may identify the mobile advertisement data and the mobile advertisement action targeted to the request and the mobile carrier data. The processor may append the mobile advertisement action data to the mobile advertisement data. The processor may provide the mobile advertisement data with the appended mobile advertisement action data to the mobile device via the interface.

Other systems, methods, features and advantages are, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The present description relates generally to a system and method, generally referred to as a system, for providing mobile advertisement actions, and more particularly, but not exclusively, to providing mobile advertisement actions with a mobile advertisement to a user on a mobile device.

The system may allow advertisers to engage mobile users by providing users with a simple interface for accessing multi-step mobile actions. The mobile advertisement actions may provide the users with a one click interface to a variety of complex mobile actions, such as making phone calls, sending text message, purchasing products, making reservations, or generally any action that can be performed with a mobile phone. Accomplishing these actions in the prior art may have required a user to perform several clicks and/or switch applications and/or manually entering data with their mobile device. It may be burdensome for a user to perform those tasks with a mobile device. The mobile advertisement actions allow the users to accomplish these actions with one interaction with their mobile device, such as a click or selection.

Figure 1:
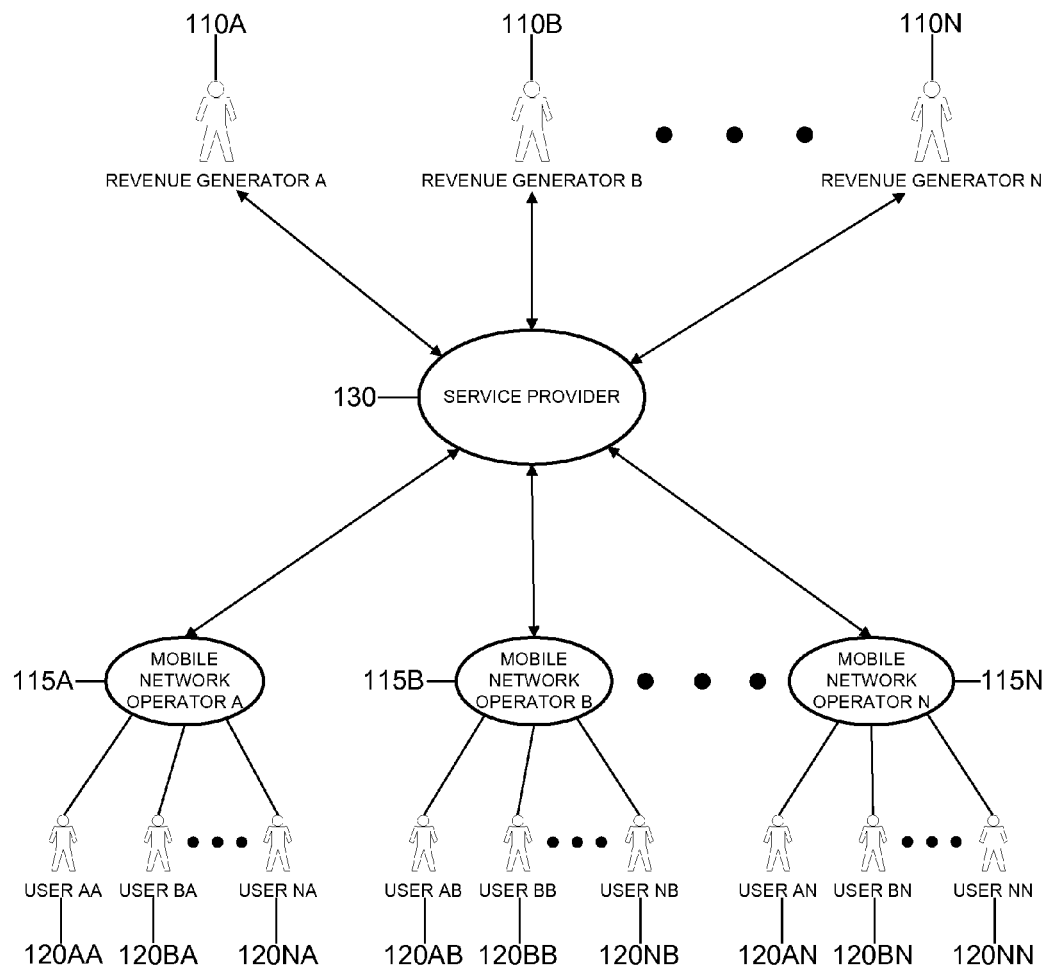
FIG. 1 is a block diagram of a general overview of a system for providing mobile advertisement actions.

FIG. 1 provides a general overview of a system 100 for providing mobile advertisement actions. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as mobile advertisers, a service provider 130, such as a portal or an advertising service provider, one or more mobile network operators ("MNOs") 115A-N, more commonly referred to as mobile carriers, or simply carriers, and one or more users 120AA-NN, such as mobile subscribers or consumers. The service provider 130 may implement a mobile advertising campaign management system incorporating an auction based and/or non-auction based advertisement serving system.

The mobile advertising campaign management system may support targeting advertisements to the users 120AA-NN through a variety of mobile advertising tactics, such as search targeting, content match targeting and behavioral profile targeting. Search targeting may refer to targeting advertisements, at least in part, to mobile keywords provided by the users, content match targeting may refer to targeting advertisements, at least in part, to the content of a particular mobile page, and behavioral profile targeting may refer to targeting advertisements, at least in part, to the mobile behavior of the users 120AA-NN. The service provider 130 may share revenue with the MNOs 115A-N for displaying advertisements of the revenue generators 110A-N on their mobile networks. Alternatively or in addition the service provider 130 may share revenue with individual mobile publishers for displaying advertisements of the revenue generators 110A-N on their mobile sites.

The revenue generators 110A-N may pay the service provider 130 to serve, or display, advertisements of their goods or services, such as on-line or mobile advertisements, to the users 120AA-NN, such as over mobile messaging, mobile web, the Internet, or generally any mode of displaying advertisements. The advertisements may include sponsored listings, banners ads, popup advertisements, mobile messages, or generally any way of attracting the users 120AA-NN to the web site or mobile site of the revenue generators 110A-N. The revenue generators 110A-N may bid on specific MNOs 115A-N to target their advertisements to. For example, the revenue generator A 110A may bid on one or more keywords searched for via the MNO A 115A. In this case the mobile advertisements of the revenue generator A 110A may only be displayed to the users 120AA-NA when the users 120AA-NA search for the keywords through the MNO A 115A.

The MNOs 1115A-N may provide a mobile network to the users 120AA-NN which may provide a variety of services to the users 120AA-NN, such as the ability to send and receive phone calls, send and receive mobile messages, to access the internet and/or the mobile web, or generally any service that may be implemented on a mobile device. The MNOs 115A-N may store data describing the users 120AA-NN, such as billing addresses, call histories, messaging histories, or generally any data regarding the users 120AA-NN that may be available to the MNOs 115A-N.

The users 120AA-NN interacting with the service provider 130 on a mobile device may want to click on fewer links than a Web user before obtaining the information that they seek. A mobile advertisement action is provided that allows users 120AA-NN to directly click to a specified action in a single step, without the need to navigate through multiple steps to accomplish the action. Such a mobile advertisement action also allows increased functionality for revenue generators 110A-N who do not have their own mobile webpage set up but who nonetheless want to provide extra functionality to users 120AA-NN.

A mobile advertisement action may be any functional object, item, applet, program, plug-in, or other device that allows a user AA 120AA to click directly to an action associated with the mobile advertisement. A mobile advertisement action may be associated with a voice command so that a user AA 120AA can activate the action by a voice command while browsing a mobile web page. A mobile device may include other functionality allowing accessibility by any other interaction with a mobile webpage that is available.

Unlike clicking a hyperlink, which only directs a user AA 120AA to the webpage address encoded in the hyperlink, mobile advertisement actions may provide a wide range of functionality when clicked on by a user AA 120AA. Instead of simply directing a user AA 120AA to another webpage, a mobile advertisement action may execute encoded or programmed functions. The mobile advertisement action itself may be a set of instructions or computer code. Alternatively or in addition the mobile advertisement action may be a link that provides the instructions or code from the service provider 130.

For example, if a user AA 120AA clicks on a mobile advertisement action of an advertisement associated with a revenue generator A 110A, the mobile advertisement action may cause the mobile device to dial the phone number of the revenue generator A 110A, make a reservation with the revenue generator A 110A, display a map or directions to the physical location of the revenue generator A 110A, program the address of the revenue generator A 110A into a navigation system of a user AA 120AA, purchase a product from the revenue generator A 110A, or may perform any other function associated with the mobile device and the revenue generator A 110A. Several examples of specific mobile advertisement actions are provided in FIG. 7.

The users 120AA-NN may be consumers of goods or services who may be searching for a business such as the business of one of the revenue generators 110A-N. The users 120AA-NN may communicate with the service provider 130 through the MNOs 115A-N. The users 120AA-NN may supply information describing themselves to the service provider 130, such as the location, gender, mailing address, credit card information, or age of the users 120AA-NN, or generally any information that may be required for the users 120AA-NN to utilize the services provided by the service provider 130. Alternatively or in addition the service provider 130 may obtain information about the users 120AA-NN from the MNOs 115A-N.

In system 100, the revenue generators 110A-N may interact with the service provider 130, such as via a web application. The revenue generators 110A-N may send information, such as billing, website or mobile site and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120AA-NN may also interact individually with the service provider 130, through the MNOs 115A-N, such as via a mobile phone or any device capable of communicating with the MNOs 115A-N. The users 120AA-NN may interact with the service provider 130 via a mobile web based application, a mobile standalone application, or any application capable of running on a mobile device. The service provider 130 may communicate data to the revenue generators 110A-N over a network and to the users 120AA-NN over a network via the MNOs 115A-N. The following examples may refer to a revenue generator A 1110A as an online advertiser or mobile advertiser; however the system 100 may apply to any revenue generators 110A-N who may desire to serve advertisements over mobile devices.

In operation, one of the revenue generators 110A-N, such as revenue generator A 110A, may provide information to the service provider 130. This information may relate to the transaction taking place between the revenue generator A 110A and the service provider 130, or may relate to an account the revenue generator A 110A maintains with the service provider 130. In the case of a revenue generator A 110A who is a mobile advertiser, the revenue generator A 110A may provide initial information necessary to open an account with the service provider 130.

A revenue generator A 110A who is a mobile advertiser may maintain one or more accounts with the service provider 130. For each account the revenue generator A 110A may maintain one or more campaigns. For each campaign the revenue generator A 110A may maintain one or more ad groups. An ad group may be associated with one or more MNOs 115A-N, and may include one or more keywords, or categories, and one or more mobile advertisements. Each advertisement may be associated with one or more mobile advertisement actions. A mobile advertisement may be provided with associated mobile advertisement actions to a user AA 120AA when the user AA 120AA interacts with the service provider 130 through an MNO A 115A associated with the mobile advertisement. The service provider 130 may verify that the mobile device of the user AA 120AA is capable of performing the mobile advertisement actions. If the mobile device is not capable of performing a mobile advertisement action, the mobile advertisement action may not be provided to the user AA 120AA. The revenue generator A 110A may be able to associate different mobile advertisement actions for each of the MNOS 115A-N associated with the mobile advertisement.

A mobile advertisement action may be a clickable interactive object embedded in an advertisement, such as a button or a link. The mobile advertisement action may represent one or more operations that may be performed by a mobile device, such as email, text messaging, phone calling, or generally any operation that may be performed by a mobile device and may provide may provide enhanced advertising capabilities to a revenue generator A 110A. The mobile advertisement action may include data specific to the revenue generator A 110A, such as the phone number, address, or generally any information specific to the revenue generator A 110A. The mobile advertisement action may include a description such as "Click to call," "Click to SMS," "Click to coupon," "Click to download," "Click to survey," "Click to make reservation," "Click to attend event," "Click to buy," or generally any description that may describe the functionality provided by them mobile advertisement action.

When the user AA 120AA clicks on a mobile advertisement action of a revenue generator A 110A, the mobile advertisement action may cause the mobile device of the user AA 120AA to perform the action associated with the mobile advertisement action in accordance with the data of the revenue generator A 110A. For example, if the mobile advertisement action is a mobile call action, then, when clicked on, the mobile advertisement action may cause the mobile device of the user AA 120AA to call a phone number associated with the revenue generator A 110A. Alternatively or in addition, when clicked on, the mobile advertisement action may communicate with the service provider 130 and the service provider 130 may cause the mobile device of the user AA 120AA to perform the specified action, such as by providing instructions to the mobile device and causing the instructions to be executed.

Alternatively or in addition if a revenue generator A 110A does not have a mobile site URL for an MNO A 115A the service provider 130 may dynamically create a "WAP ad." The "WAP ad" may be an offer landing page containing detailed information about the revenue generator A 110A. The detailed information may include the phone number of the revenue generator A 10A, a logo of the revenue generator A 110A, an address of the revenue generator A 110A, offers and coupons from the revenue generator A 110A, an SMS number, software or programs for download, survey materials, marketing materials, mobile advertisement actions, and any other relevant or business information about the revenue generator A 110A. When a user AA 120AA clicks on the advertisement of the revenue generator A 110A who does not have a mobile site, the user AA 120AA may be taken to the offer landing page showing the phone number, any mobile advertisement actions, and/or logo of the revenue generator A 110A.

The keywords associated with an ad group may represent one or more search terms that the revenue generator A 110A wishes to associate with their advertisement generally, or with one or more of the advertisement's mobile advertisement actions specifically. When a user AA 120AA searches for a search keyword via an MNO A 115A associated with the ad group, the mobile advertisement and the associated mobile advertisement actions of the revenue generator A 110A may be displayed on the search results page. The service provider 130 may also implement directory search implementations, where the user AA 120AA may click through directories of families of related data. In this instance the search keyword may be the name of the directory the user AA 120AA clicks on. Alternatively or in addition the user AA 120AA may interact with the service provider 130 through an SMS search service or a voice search service.

For example, a revenue generator A 110A, such as MCDONALDS, may desire to target a mobile advertisement for a MCDONALDS BIG MAC to users 120AA-NA on MNO A 115A searching for the keywords "BIG MAC." MCDONALDS may place a bid with the service provider 130 for the keyword "BIG MAC" on MNO A 115A. The revenue generator A 1110A may also provide any variety of information to the service provider 130 including the worldwide locations of its businesses, phone numbers of each business locations, coupons for one or more of its products, or any other relevant information or files. The mobile advertisement of the revenue generator A 110A may be displayed when one of the users 120AA-NA, such as the user AA 120AA, interacts with the service provider 130 via the MNO A 115A. The user AA 120AA may search for the keyword "BIG MAC" or may click through a directory named "BIG MAC." In addition to displaying a description of a "BIG MAC," the advertisement may also display any of a number of mobile advertisement actions, such as a button to get a coupon for a "BIG MAC," a button to call MCDONALDS, a button to get directions to the MCDONALDS most proximate to the location of the user AA 120AA, or any other relevant mobile advertisement actions. Alternatively or in addition the service provider 130 may display the advertisement for a "BIG MAC," and the associated mobile advertisement actions, when the user AA 120AA is located near a MCDONALDS location.

When one of the users 120AA-NN, such as the user AA 120AA, interacts with the service provider 130, such as by searching for a keyword, the service provider 130 may retain data describing the interaction with the user AA 120AA. The retained data may include the keyword searched for, the geographic location of the user AA 120AA, and the date/time the user AA 120AA interacted with the service provider 130. The data may also generally include any data available to the service provider 130 that may assist in describing the interaction with the user AA 120AA, or describing the user AA 120AA. The service provider 130 may also store data that indicates whether a mobile advertisement of one of the revenue generators 110A-N, such as the revenue generator A 110A was displayed to the user AA 120AA, and whether the user AA 120AA clicked on the mobile advertisement or one or more of its mobile advertisement actions.

The service provider 130 may already have information relating to the geographic location of the user AA 120AA and other information describing the user AA 120AA, such as gender, age, etc. This information may have been previously supplied to the service provider 130 by the user AA 120AA. Alternatively or in addition the service provider 130 may obtain the location of the user AA 120AA based on the IP address of the user AA 120AA, a location of a cell phone tower in communication with the user, or a positioning system, such as a global positioning system (GPS), in communication with the mobile device. The service provider 130 may use a current date/time stamp to store the date/time when the user AA 120AA interacted with the service provider 130. The service provider 130 may use any of the information describing the user or the keyword searched for by the user to evaluate the relevancy of an advertisement or one or more of its mobile advertisement actions to the search.

Furthermore, the service provider 130 may generate reports based on the data collected from the users 120AA-NN and may communicate the reports to the revenue generators 110A-N to assist the revenue generators 110A-N in measuring the effectiveness of their mobile advertising campaigns. The reports may indicate the number of times the users 120AA-NN viewed a mobile advertisement and/or mobile advertisement action of the revenue generators 110A-N, the number of times a mobile advertisement or mobile advertisement action of the revenue generators 110A-N was clicked on by the users 120AA-NN, or generally any information useful to the revenue generators 110A-N.

More detail regarding the aspects of a mobile advertising auction-based systems, as well as the structure, function and operation of the service provider 130 as a mobile advertising provider, as mentioned above, can be found in commonly owned U.S. patent application Ser. No. 11/712,276, filed on Feb. 28, 2007, entitled, "SYSTEM FOR SERVING ADVERTISEMENTS OVER MOBILE DEVICES," which is hereby incorporated herein by reference in its entirety. The systems and methods herein associated with mobile advertising campaign management may be practiced in combination with methods and systems described in the above-identified patent application incorporated by reference.

Figure 2:
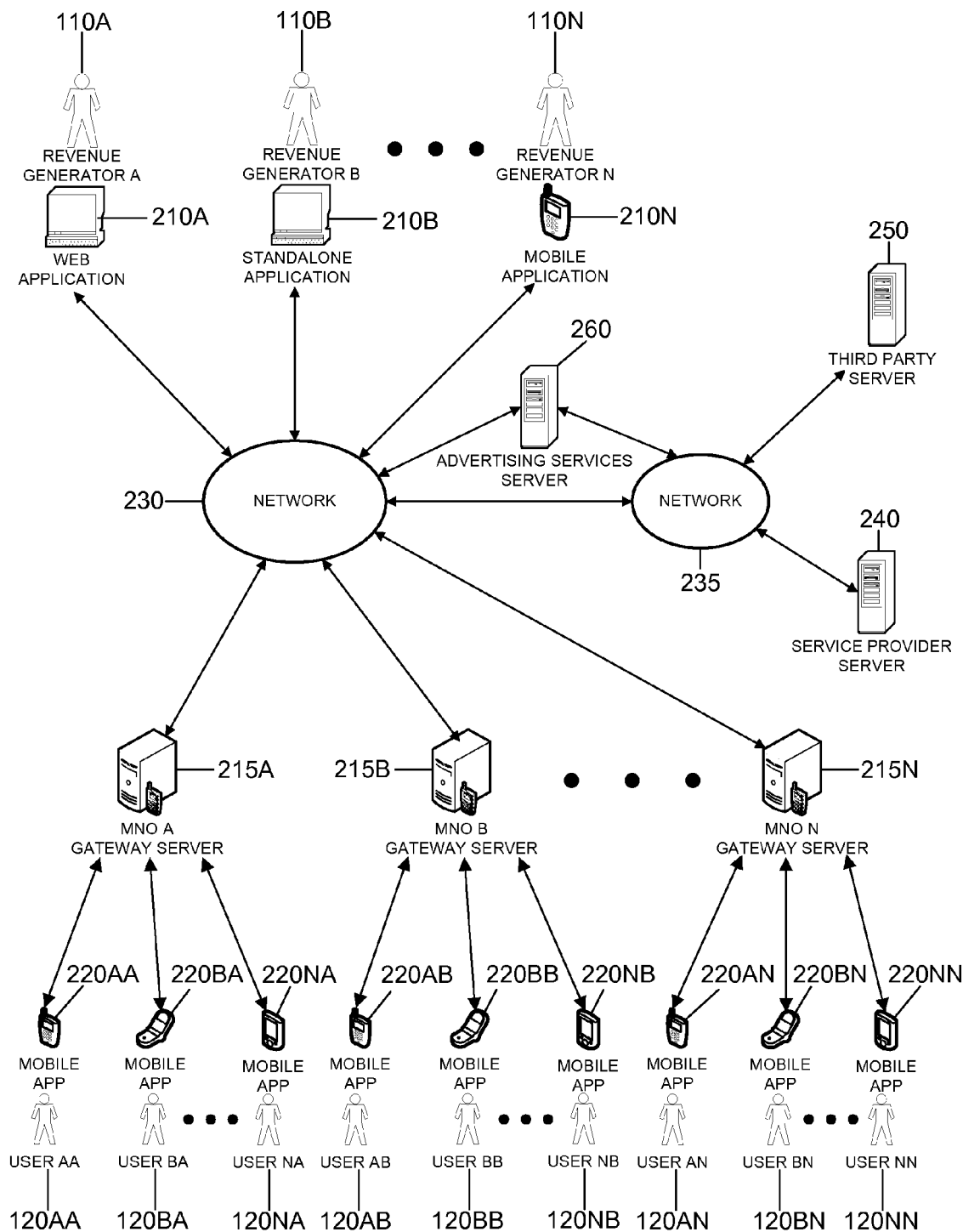
FIG. 2 is block diagram of a simplified view of a network environment implementing a system for providing mobile advertisement actions.

FIG. 2 provides a simplified view of a network environment implementing a system 200 for serving advertisements including mobile advertisement actions over mobile devices. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A-N, which may be collectively or individually referred to as client applications of the revenue generators 110A-N. The system 200 may also include one or more mobile applications, or mobile apps 220AA-NN, which may collectively be referred to as client applications of the users 120AA-NN, or individually as a user client application. The system 200 may also include one or more MNO gateway servers 215A-N, a network 230, a network 235, the service provider server 240, a third party server 250, and an advertising services server 260.

Some or all of the advertisement services server 260, service provider server 240, and third-party server 250 may be in communication with each other by way of network 235 and may be the system or components described below in FIG. 11. The advertisement services server 260, third-party server 250 and service provider server 240 may each represent multiple linked computing devices. Multiple distinct third party servers, such as the third-party server 250, may be included in the system 200. The third-party server 250 may be an MNO gateway server 215A-N or a server associated with, or in communication with an MNO gateway server 215A-N.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. The service provider server 240 may communicate to the revenue generators 110A-N via the networks 230, 235, through the web applications, standalone applications or mobile applications 210A-N.

The users 120AA-NN may use a mobile application 220AA-220NN, such as a mobile web browser, to communicate with the service provider server 240, via the MNO gateway servers 215A-N and the networks 230, 235. The service provider server 240 may communicate to the users 120AA-NN via the networks 230, 235 and the MNOs 215A-N, through the mobile applications 220AA-NN.

The web applications, standalone applications and mobile applications 210A-N, 220AA-NN may be connected to the network 230 in any configuration that supports data transfer. This may include a data connection to the network 230 that may be wired or wireless. Any of the web applications, standalone applications and mobile applications 210A-N, 220AA-NN may individually be referred to as a client application. The web application 210A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B may run on a machine that may have a processor, memory, a display, a user interface and a communication interface. The processor may be operatively connected to the memory, display, and the interfaces and may perform tasks at the request of the standalone applications 210B or the underlying operating system. The memory may be capable of storing data. The display may be operatively connected to the memory and the processor and may be capable of displaying information to the revenue generator B 110B. The user interface may be operatively connected to the memory, the processor, and the display and may be capable of interacting with a revenue generator A 110A. The communication interface may be operatively connected to the memory, and the processor, and may be capable of communicating through the networks 230, 235 with the service provider server 240, third party server 250 and advertising services server 260. The standalone applications 210B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220AA-NN may run on any mobile device which may have a data connection. The mobile applications 210N, 220AA-NN may be a web application 210A, a standalone application 210B, or a mobile browser. The mobile device may be one of a broad range of electronic devices which may include mobile phones, PDAs, and laptops and notebook computers. The mobile device may have a reduced feature set, such as a smaller keyboard and/or screen, and may be incapable of supporting a traditional web search.

The data connection of the mobile device may be a cellular connection, such as a GSM/GPRS/WCDMA connection, a wireless data connection, an internet connection, an infra-red connection, a Bluetooth connection, or any other connection capable of transmitting data. The data connection may be used to connect directly to the network 230, or to connect to the network 230 through the MNO gateway servers 215A-N. The MNO gateway servers 215A-N may control the access the mobile applications 210AA-NN may have to the network. The MNO gateway servers 215A-N may also control the technology supporting the respective mobile applications 220AA-NN. This may affect all aspects of the user experience, such as signal strength and availability, speed and billing mechanisms. For example, the MNO gateway server A 215A may only allow the users 120AA-NA access to content provided by partners of the MNO A 115A. Furthermore, the MNO gateway servers 215A-N may only allow users 120AA-NN access to data in a specific format, such as WML, XHTML, NTT DOCOMO IMODE HTML, or cHTML. Alternatively or in addition, the mobile applications 220AA-NN may only support one of the aforementioned formats.

The service provider server 240 may include one or more of the following: an application server, a data source, such as a database server, a middleware server, and an advertising services server. One middleware server may be a mobile commerce platform, such as the YAHOO! SUSHI platform, which may properly encode data, such as mobile pages or mobile advertisements, to the formats specific to the MNO gateway servers 215A-N. The service provider server 240 may co-exist on one machine or may be running in a distributed configuration on one or more machines. The service provider server 240 may collectively be referred to as the server. The service provider server 240 may receive requests from the users 120AA-NN and the revenue generators 110A-N and may serve mobile pages to the users 120AA-NN and web pages and/or mobile pages to the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The advertising services server 260 may provide a platform for the inclusion of advertisements with mobile advertisement actions in pages, such as web pages or mobile pages. The advertisement services server 260 may be used for providing mobile advertisements and/or mobile advertisement actions that may be displayed to the users 120AA-NN.

Figure 11:
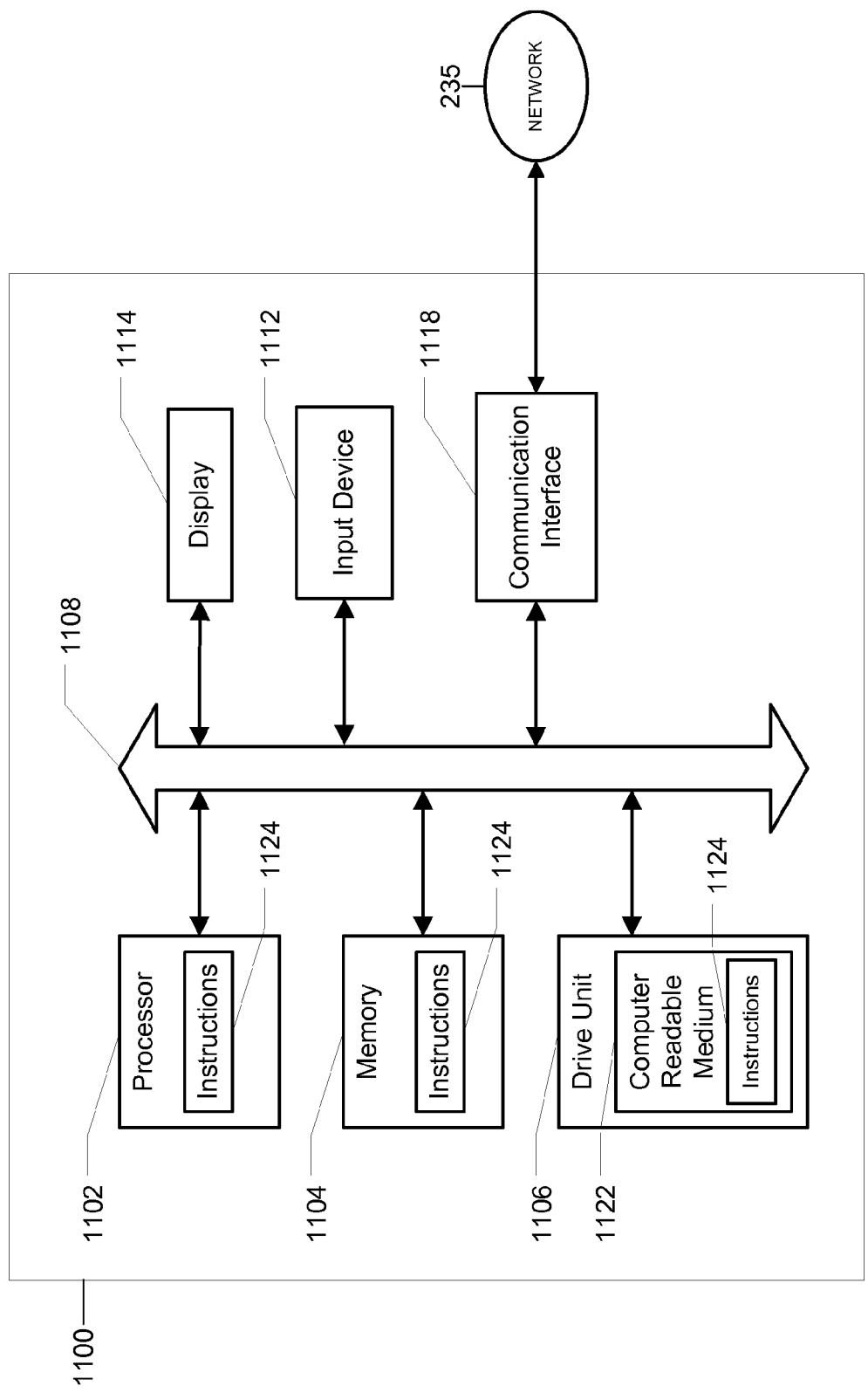
FIG. 11 is an illustration a general computer system that may be used in a system for providing mobile advertisement actions.

The service provider server 240, the third party server 250 and the advertising services server 260 may be one or more computing devices of various kinds, such as the computing device in FIG. 11. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120AA-NN and the revenue generators 110A-N. The advertising services server 260 may provide a platform for the inclusion of advertisements with mobile advertisement actions in pages, such as web pages. The advertising services server 260 may also exist independent of the service provider server 240 and the third party server 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices. Other systems and methods such as the system and methods of U.S. patent application Ser. No. 11/712,276, incorporated herein by reference, may be used.

Figure 3:
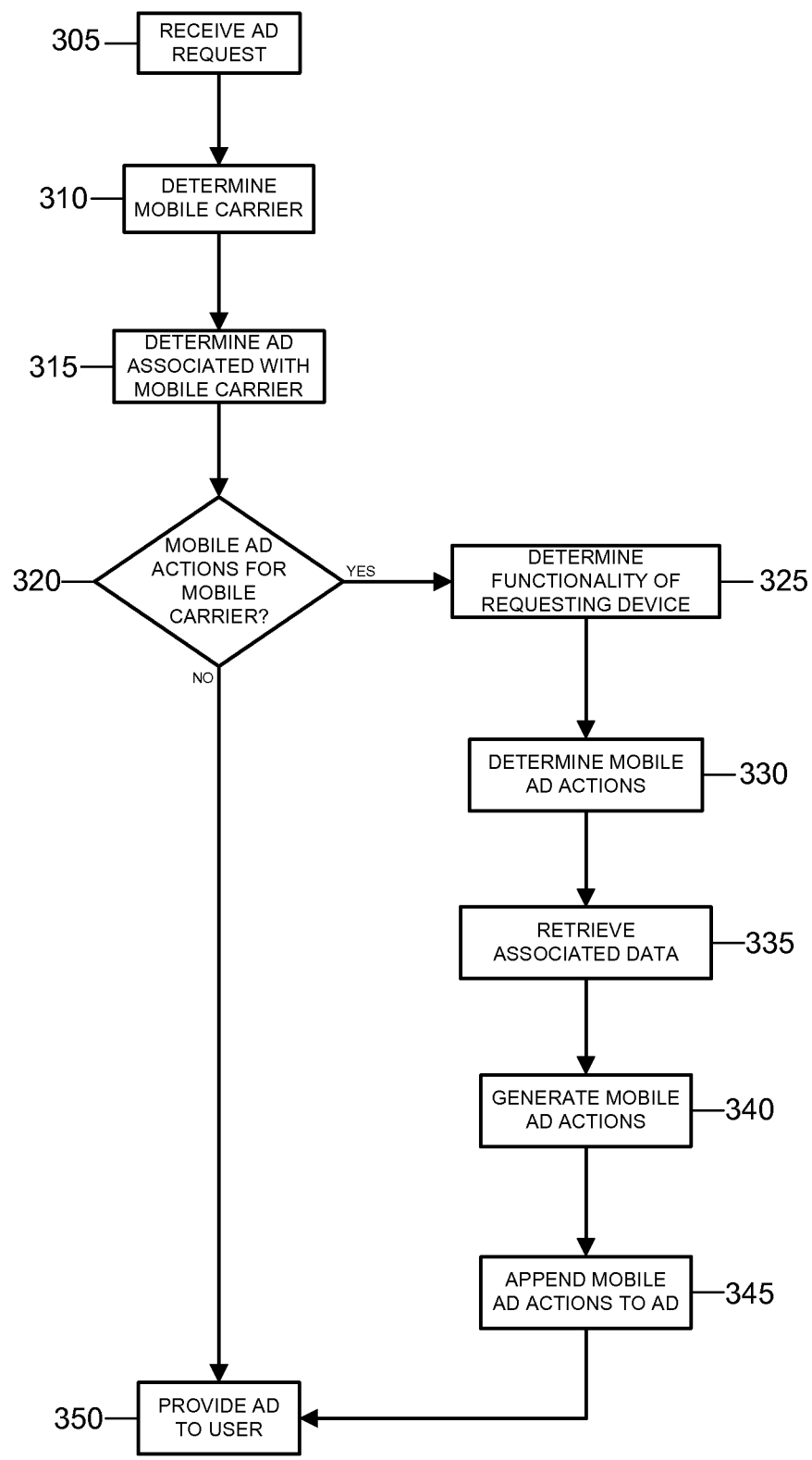
FIG. 3 is a flowchart illustrating operations of providing mobile advertisements with mobile advertisement actions in the systems of FIG. 1 and FIG. 2, or other systems for providing mobile advertisement actions.

FIG. 3 is a flowchart illustrating operations of serving mobile advertisements including mobile advertisement actions in the systems of FIG. 1 and FIG. 2, or other systems for providing mobile advertisement actions. At block 305 the service provider 130 may receive a request for a mobile advertisement. The mobile advertisement request may be related to a request from the user AA 120AA, such as a search request. Alternatively or in addition the mobile advertisement request may be related to content being viewed by the user AA 120AA, or may be related to the behavior of the user AA 120AA. The service provider 130 may also identify other associated data about the mobile device of the user AA 120AA, such as the type of device making the request, the bandwidth available, availability of Internet service, or any other necessary parameters.

Alternatively or in addition the system 100 may check whether a location for the mobile device of the user AA 120AA is available. Location may be determined by data sent from a positioning system locator in communication with the mobile device of the user AA 120AA. Alternatively, location of the mobile device of the user AA 120AA may be determined by data sent to the service provider 130 such as the IP address of the requesting user AA 120AA or an identifying code of a location of a cell phone tower in communication with mobile device of user AA 120AA. Alternatively, the user AA 120AA may provide their own location such as by entering an address or a landmark on their mobile device. Depending on the data available, the location of user AA 120AA may thus be determined to any of varying degrees of preciseness.

At block 310 the service provider 130 may analyze the request and the associated data to determine the mobile carrier associated with the mobile device of the user AA 120AA, such as the MNO A 115A. At block 315 the service provider 130 may determine a mobile advertisement associated with the MNO A 115A, and/or the associated data, such as the request from the user AA 120AA.

At block 320 the service provider 130 may determine whether any mobile advertisement actions are associated with the mobile advertisement for the mobile carrier A 115A. If there are mobile advertisement actions associated with the mobile advertisement for the mobile carrier A 115A, the system 100 may move to block 325. At block 325 the service provider 130 may determine the functionality supported by the mobile device of the user AA 120AA. The service provider 130 may determine the functionality supported by the mobile device based on data associated with the request, based on data previously submitted by the user AA 120AA, based on data received from the MNO A 115A, or generally based on any data that may be indicative of the functions supported by the mobile device.

At block 330 the service provider 130 may determine which of the mobile advertisement actions associated with the mobile advertisement and the MNO A 115A to provide to the user AA 120AA. The service provider 130 may only provide mobile advertisement actions that provide functionality supported by the mobile device of the user AA 120AA. The service provider 130 may use the functionality determined at block 325 to determine which mobile advertisement actions to provide to the user AA 120AA. For example, if the mobile device of the user AA 120AA does not support text messaging, the service provider 130 may not provide a mobile advertisement action for text messaging.

At block 335 the service provider 130 may retrieve data associated with the revenue generator A 110A related to the mobile advertisement actions. For example, if one of the mobile advertisement actions is a call action, the service provider 130 may retrieve the phone number of the revenue generator A 110A. At block 340 the service provider 130 may generate the mobile advertisement actions based on the type of mobile advertisement action, the technology supported by the mobile device of the user AA 120AA, and the data associated with the revenue generator A 110A. Alternatively or in addition the service provider 130 may generate a link that communicates a request to the service provider 130 identifying the mobile advertisement action. When the user AA 120AA clicks on the mobile advertisement action the link may communicate a request to the service provider 130 for the data implementing the mobile advertisement action. The service provider 130 may then communicate the data implementing the mobile advertisement action to the mobile device of the user AA 120AA. When the user AA 120AA has limited bandwidth it may be beneficial to only communicate links requesting the data implementing the actions. The mobile call actions may be implemented through data, code, or instructions.

At block 345 the service provider 130 may append the generated mobile advertisement actions to the mobile advertisement. The mobile advertisement actions may be represented by a link or a button in the advertisement. The mobile advertisement actions may be located anywhere on the advertisement, such as the bottom of the advertisement. At block 350 the service provider 130 may provide the mobile advertisement, including the appended mobile advertisement actions, to the user AA 120AA.

If, at block 320, there are no mobile advertisement actions associated with the mobile advertisement and the MNO A 115A, the system 100 may move to block 350. At block 350 the service provider 130 may provide the mobile advertisement, without any mobile advertisement actions, to the user AA 120AA.

Figure 4:
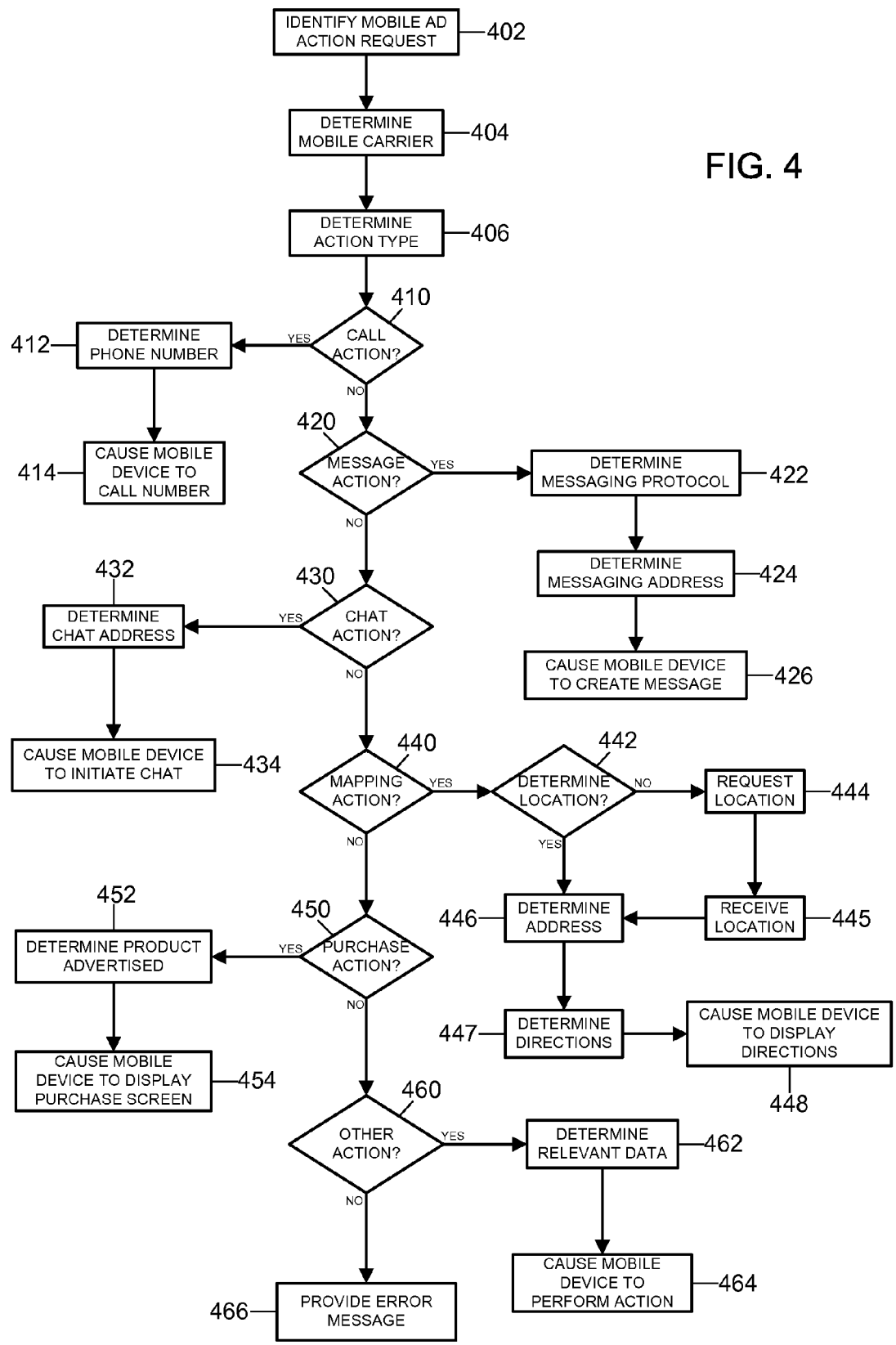
FIG. 4 is a flowchart illustrating operations of mobile advertisement actions in the systems of FIG. 1 and FIG. 2, or other systems for providing mobile advertisement actions.

FIG. 4 is a flowchart illustrating operations of mobile advertisement actions in the systems of FIG. 1 and FIG. 2, or other systems for providing mobile advertisement actions. At block 402 the service provider 130 may receive a request for a mobile advertisement action associated with a mobile advertisement of the revenue generator A 110A. The request may originate from a mobile advertisement action provided to the user AA 120AA with a link referencing the service provider 130. The link may request the service provider 130 to provide the additional data necessary to perform the mobile advertisement action.

At block 404 the service provider 130 may determine the mobile carrier associated with the mobile device requesting the mobile advertisement action, such as the MNO A 115A. At block 406 the service provider 130 may determine the type of mobile advertisement action requested. The type of mobile advertisement action may be identifiable through the request. At block 410 the service provider 130 may determine whether the mobile advertisement action is a call ad action. If the mobile advertisement action is a call ad action, the system 100 may move to block 412. At block 412 the service provider 130 may determine the phone number associated with the revenue generator A 110A. At block 414 the service provider 130 may cause the mobile device of the user AA 120AA to call the number of the revenue generator A 110A, such as by generating code capable of causing the mobile device to call the number, communicating the code to the mobile device and causing the code to be executed on the mobile device.

If, at block 410, the action type is not a call action, the system 100 may move to block 420. At block 420 the service provider 130 may determine whether the requested action is a message action. If the requested action is a message action the system 100 may move to block 422. At block 422 the service provider 130 may determine a messaging protocol supported by the mobile device of the user AA 120AA, such as email, text messaging, or generally any messaging protocol implemented on mobile devices. If the mobile device supports more than one messaging protocol, the service provider 130 may attempt to determine a default or preferred protocol. At block 425 the service provider 130 may determine the messaging address of the revenue generator A 110A for the determined messaging protocol, such as an email address, a text messaging number, or generally any messaging address. At block 426 the service provider 130 may cause the mobile device of the user AA 120AA to create a message addressed to the revenue generator A 110A, such as by generating code capable of causing the mobile device to generate the message, communicating the code to the mobile device and causing the code to be executed on the mobile device. Alternatively or in addition the service provider 130 may cause the mobile device to generate the message and send the message to the revenue generator A 110A, such as for a vote over text messaging.

If, at block 420 the mobile advertisement action is not a message action, the system 100 may move to block 430. At block 430 the service provider 130 may determine whether the mobile advertisement action is a chat action. If, at block 420, the mobile advertisement action is a chat action, the system 100 may move to block 432. At block 432 the system 100 may determine the chat address of the revenue generator A 110A. The chat address may be a phone number, a Internet-based address, a voice over internet protocol address, an instant messenger address, or generally any address capable of supporting a chat session on the mobile device of the user AA 120AA. At block 434 the service provider 130 may cause the mobile device of the user AA 120AA to initiate a chat session with the revenue generator A 110A, such as by generating code capable of causing the mobile device to initiate the chat session, communicating the code to the mobile device, and causing the code to be executed on the mobile device.

If, at block 430, the mobile advertisement action is not a chat action, the system 100 may move to block 440. At block 440 the system 100 may determine whether the mobile advertisement action is a mapping action. If, at block 440, the mobile advertisement action is a mapping action, the system 100 may move to block 442. At block 442 the service provider 130 may determine whether the location of the user AA 120AA can be automatically determined. The location of the user AA 120AA may be automatically determined through a positioning system, such as GPS, through the triangulation of a cell phone signal, through information provided by the user AA 120AA, or generally through any means of determining the location of a mobile user. If, at block 442, the service provider 130 can not determine the location of the user AA 120AA, the system 100 may move to block 444. At block 444 the service provider 130 may request the user AA 120AA provide their location. At block 445 the service provider 130 may receive the location of the user AA 120AA from the user AA 120AA.

If, at block 442, the service provider 130 is able to determine the location of the user AA 120AA, the system 100 may move to block 446. At block 446 the service provider 130 may determine the address of the revenue generator A 110A. At block 447 the service provider 130 may determine the directions from the location of the user AA 120AA to the address associated with the revenue generator A 110A. The service provider 130 may operate a mapping engine, or the third party server 250 may provide mapping functionality. At block 448 the service provider 130 may cause the mobile device of the user AA 120AA to display the directions to the location of the revenue generator A 110A, such as by generating code capable of causing the mobile device to display the directions, communicating the code to the mobile device, and causing the code to be executed on the mobile device.

If, at block 440, the mobile advertisement action is not a mapping action, the system 100 may move to block 450. At block 450 the service provider 130 may determine whether the mobile advertisement action is a purchase action. If, at block 450, the mobile advertisement action is a purchase action, the system 100 may move to block 452. At block 452 the service provider 130 may determine the product of the revenue generator A 110A that is advertised in the advertisement associated with the mobile advertisement action. At block 454 the service provider may cause the mobile device of the user AA 120AA to display a purchase screen for the product, such as by generating code capable of causing the mobile device to display the purchase screen, communicating the code to the mobile device, and causing the code to be executed on the mobile device. Alternatively or in addition the service provider 130 may cause the mobile device of the user AA 120AA to purchase the product. The user AA 120AA may need to associate a form of payment with their mobile device, such as a credit card. Alternatively or in addition the charges for the purchase may be applied to the phone bill of the user AA 120AA.

If, at block 450, the mobile advertisement action is not a purchase action, the system 100 may move to block 460. At block 460 the service provider 130 may determine whether the mobile advertisement action is some other type of mobile advertisement action. If, at block 460, the service provider 130 determines that the mobile advertisement action is some other type of mobile advertisement action, the system 100 may move to block 462. At block 462 the service provider 130 may determine data relevant to the mobile advertisement action, such as data associated with the revenue generator A 110A. At block 464 the service provider 130 may cause the mobile device of the user AA 120AA to perform the mobile advertisement action, such as by generating code capable of causing the mobile device to perform the action, communicating the code to the mobile device, and causing the code to be executed on the mobile device.

If, at block 460, the service provider 130 determines that the action type of the requested mobile advertisement action is not a known action type, the service provider 130 may communicate an error message to the user AA 120AA. Alternatively or in addition if the action type is not supported by the mobile device of the user AA 120AA, the service provider 130 may provide an error message to the user AA 120AA.

Figure 5:
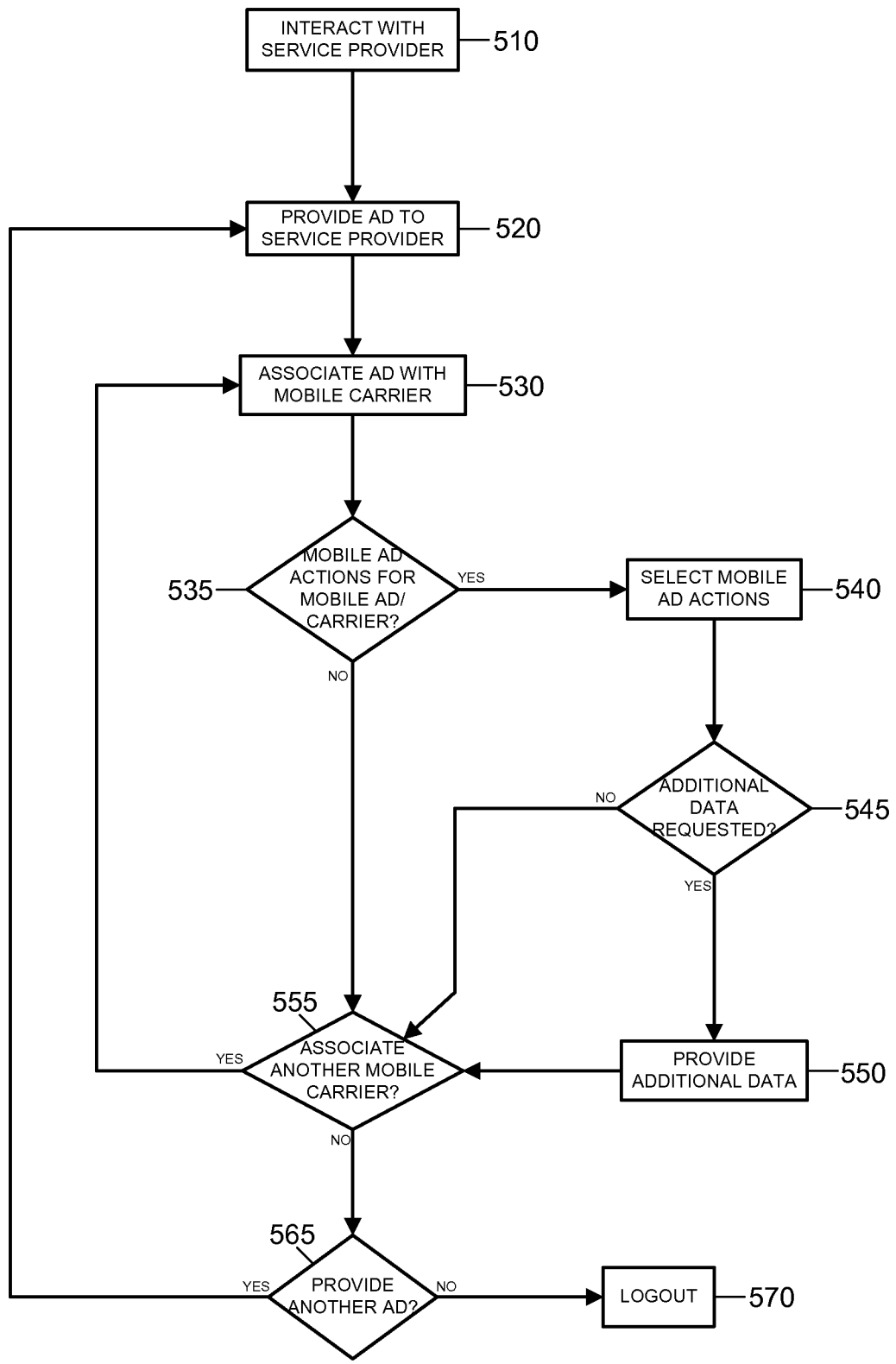
FIG. 5 is a flowchart illustrating steps that may be taken by a revenue generator in the systems of FIG. 1 and FIG. 2, or other systems for providing mobile advertisement actions.

FIG. 5 is a flowchart illustrating steps that may be taken by a revenue generator in the systems of FIG. 1 and FIG. 2, or other systems for providing mobile advertisement actions. At block 510 one of the revenue generators 110A-N, such as the revenue generator A 110A, may interact with the service provider 130, such as logging into a web site provided by the service provider 130. At block 520 the revenue generator A 110A may provide a mobile advertisement to the service provider 130, such as a mobile advertisement to associate with an ad group. At block 530 the revenue generator A 110A may associate the mobile advertisement with one or more MNOs 115A-N, such as the MNO A 115A. At block 535 the revenue generator A 110A may indicate whether they would like to associate mobile advertisement actions with the mobile advertisement.

If, at block 535, the revenue generator A 110A would like to associate mobile advertisement actions with the mobile advertisement, the system 100 may move to block 540. At block 540 the revenue generator A 110A may select one or more types of mobile advertisement actions to associate with the mobile advertisement. At block 545 the service provider 130 may request any additional information required to implement the selected mobile advertisement actions, such as the phone number of the revenue generator A 110A for a call action. If, at block 545, additional data is requested by the service provider 130, the system 100 may move to block 550. At block 550 the revenue generator A 110A may provide the additional data requested by the service provider 130. The service provider 130 may then associate the mobile advertisement actions with the mobile advertisement and the MNO A 1115A.

If, at block 535, the revenue generator A 110A does not wish to associate any mobile call actions with the mobile advertisement and the MNO A 115A, the system 100 may move to block 555. If, at block 545, the service provider 130 does not request any additional data the system 100 may move to block 555. At block 555 the revenue generator A 110A may indicate whether they would like to associate another one of the MNOs 115B-N with the mobile advertisement. If, at block 555 the revenue generator A 110A indicates that they would like to associate another one of the MNOs 115B-N with the mobile advertisement the system 100 may move to block 530 and repeat the process.

If, at block 555, the revenue generator A 110A indicates that they do not wish to associate another one of the MNOs 115B-N with the mobile advertisement, the system 100 may move to block 565. At block 565 the revenue generator A 110A may indicate whether they wish to provide another mobile advertisement to the service provider 130. If, at block 565, the revenue generator A 110A indicates they would like to provide an additional mobile advertisement to the service provider 130 the system 100 may move to block 520. At block 520 the revenue generator A 110A may provide the additional advertisement to the service provider 130 and repeat the process.

If, at block 565, the revenue generator A 110A indicates that they do not wish to provide any other mobile advertisements to the service provider 130, the system 100 may move to block 570. At block 570 the revenue generator A 110A may logout of the web site of the service provider 130.

Figure 6:
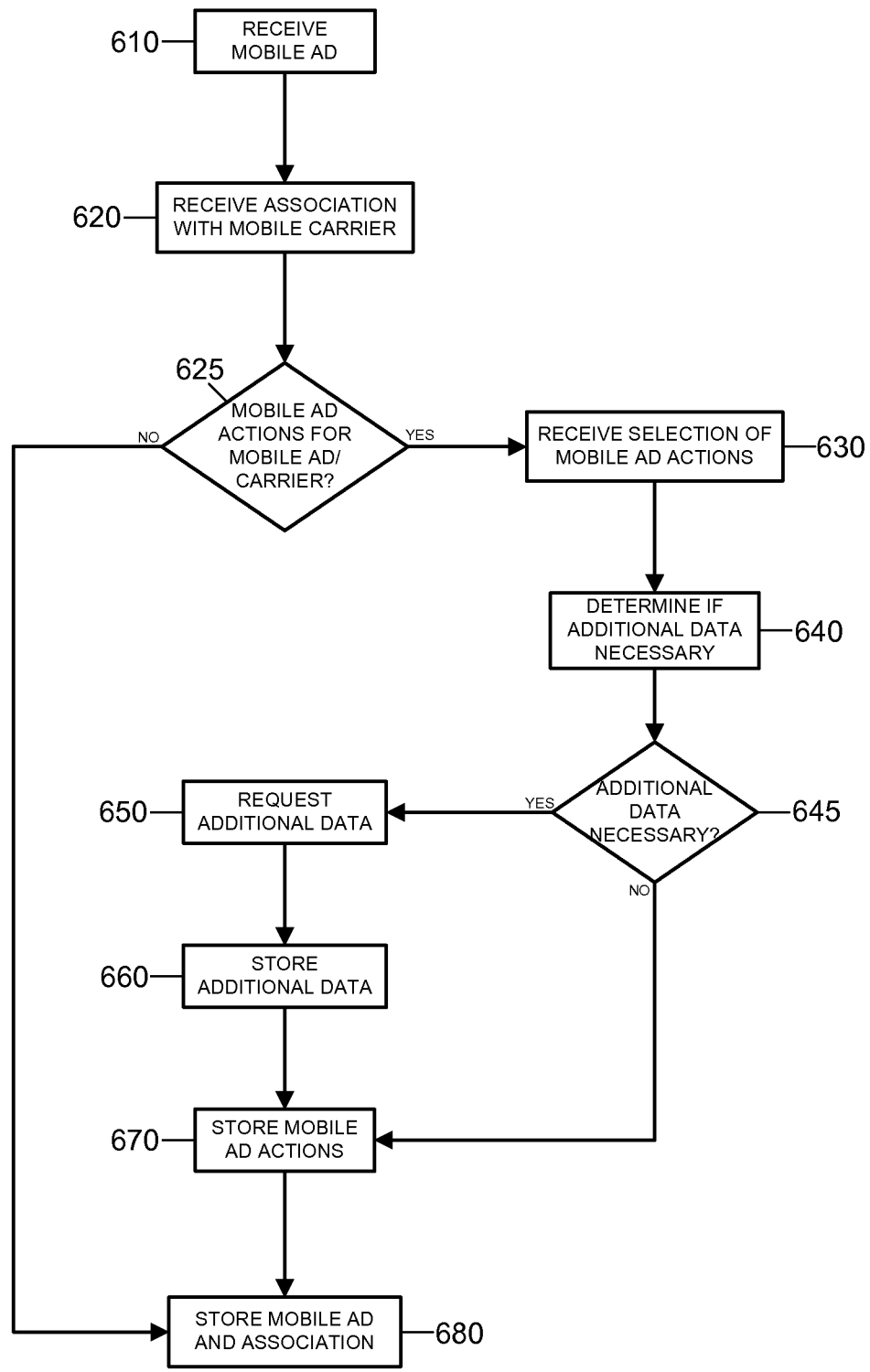
FIG. 6 is a flowchart illustrating the operations of creating mobile advertisement actions in the systems of FIG. 1 and FIG. 2, or other systems for providing mobile advertisement actions.

FIG. 6 is a flowchart illustrating the operations of creating mobile advertisement actions in the systems of FIG. 1 and FIG. 2, or other systems for providing mobile advertisement actions. At block 610 the service provider 130 may receive a mobile advertisement from one of the revenue generators 110A-N. The mobile advertisement may be received in the process of creating, or modifying, an ad group. At block 620 the service provider 130 may receive an association of one of the MNOs 115A-N, such as the MNO A 115A, with the mobile advertisement from the revenue generator A 110A. Alternatively or in addition the revenue generator A 110A may have previously associated one or more MNOs 115A-N with the ad group. At block 625 the service provider 130 may receive an indication from the revenue generator A 110A as to whether the revenue generator A 110A would like to associate mobile advertisement actions with the mobile advertisement for the MNO A 115A.

If, at block 625, the service provider 130 receives an indication that the revenue generator A 110A would like to associate mobile advertisement actions with the mobile advertisement for the MNO A 115A the system 100 may move to block 630. At block 630 the service provider 130 may receive a selection of the types of mobile advertisement actions to associate with the mobile advertisement for the MNO A 115A. At block 640 the service provider 130 may determine whether the selected types of mobile advertisement actions require additional information from the revenue generator A 110A. For example, a call action may require a phone number of the revenue generator A 110A, while a mapping action may require an address of the revenue generator A 110A. The service provider 130 may be able to retrieve the required information from data associated with the account of the revenue generator A 110A stored in the data store 245. If the required data is not stored in the data store 245 then the service provider 130 may need to request the additional data from the revenue generator A 110A.

If, at block 645, the service provider 130 needs to request additional data from the revenue generator A 110A, then the system 100 may move to block 650. At block 650 the service provider 130 may request additional data from the revenue generator A 110A. At block 660 the service provider 130 may store the additional data provided by the revenue generator A 110A, such as in the data store 245. If, at block 645, no additional information is necessary from the revenue generator A 110A, then the system 100 may move to block 665. At block 665 the service provider 130 may generate the mobile advertisement actions based on the data associated with the revenue generator A 110A and the MNO A 115A. At block 670 the service provider 130 may store the selected mobile advertisement actions.

If, at block 625, the revenue generator A 110A does not indicate that they would like to associate mobile advertisement actions with the mobile advertisement, and the MNO A 115A, the system 100 may move to block 680. At block 680 the service provider 130 may store the mobile advertisement and the association between the mobile advertisement, the MNO A 115A, and any selected mobile advertisement actions.

Figure 7:
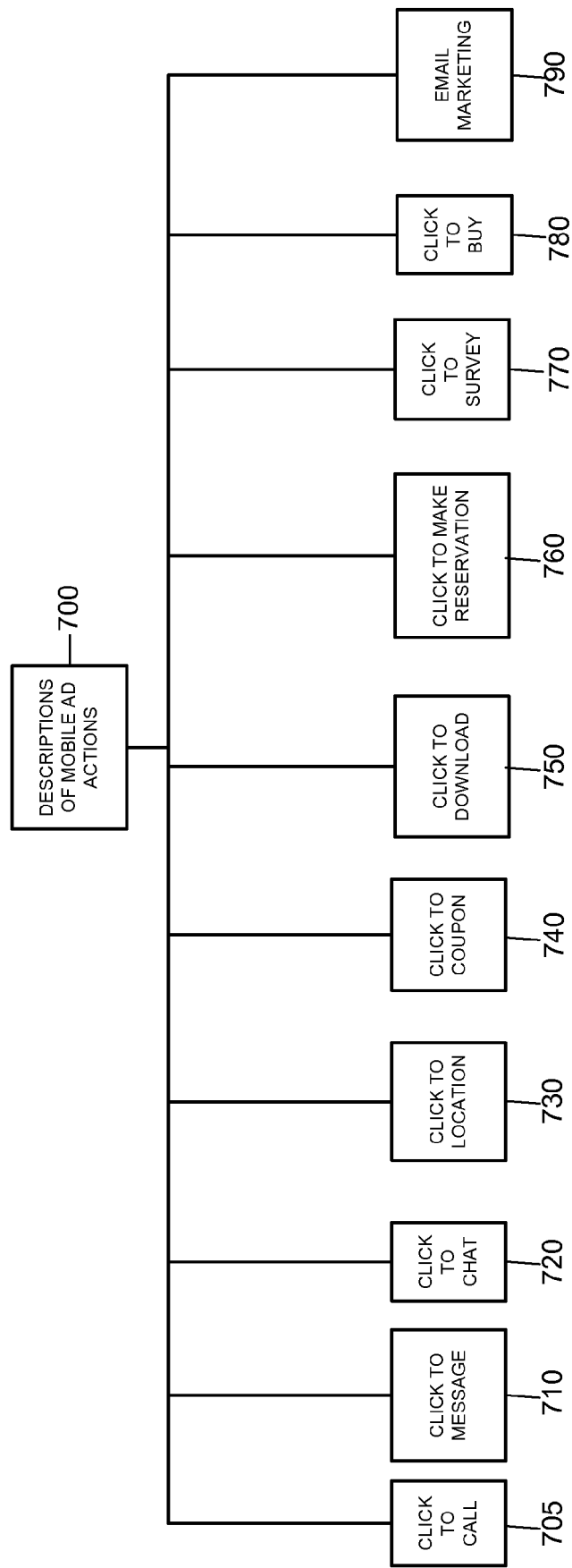
FIG. 7 is a block diagram illustrating several mobile advertisement actions of an advertisement served to a user in the systems of FIG. 1 and FIG. 2, or other systems for providing mobile advertisement actions.

FIG. 7 is a block diagram illustrating descriptions of several mobile advertisement actions 700 which may be served to users 120AA-NN as described in FIGS. 1-6 or in other systems for providing mobile advertisement actions. The mobile advertisement actions may be any of a plurality of action items presented as text, images, buttons, or any other suitable device to provide the users 120AA-NN with a direct link to any number of specified actions. Mobile advertisement actions may provide the users 120AA-NN with direct access to an action without having to navigate through multiple screens, applications, or various webpages to otherwise accomplish the action. The mobile advertisement actions may reduce the amount of input the users 120AA-NN must provide to accomplish a mobile action. The revenue generator A 110A may select any number of mobile advertisement actions to be communicated to the user AA 120AA with the mobile advertisement.

Revenue generator A 110A may provide relevant information to service provider 130 to enable mobile advertisement actions on an advertisement. This may be accomplished during an initial set-up process or at a later time. Mobile advertisement actions may be set to be static or dynamic. Static mobile advertisement actions may be displayed with the advertisement every time the advertisement is displayed on a mobile device. The phone number of revenue generator A 110A, which only has one contact phone number, may be one such static mobile advertisement action. In this case the phone number may be presented with the advertisement at all times allowing the user to click on a "click to call" mobile advertisement action 705 which directs the mobile device of the user AA 120AA to dial the revenue generator A 110A who provided the advertisement. Alternatively or in addition a dynamic mobile advertisement action may vary when displayed to a mobile device with the advertisement. Revenue generator A 110A may set the mobile advertisement actions to vary based on time, date, day of the week, location of the user or other parameters. For example, where a revenue generator A 110A is a chain of stores, the "click to call" action 705 may dial a store of the revenue generator A 110A that is located closest to the location of the mobile device of the user AA 120AA. The call actions described below have been given descriptions to better describe their functions. However, it is to be noted that call actions may be named or described by any suitable term even though they may have similar functions.

One mobile action may include the previously mentioned "click to call" action 705. Clicking a "click to call" action 705 allows user AA 120AA to initiate a direct call to a phone number associated with the advertisement. The mobile device of user AA 120AA may dial the mobile advertisement action phone number directly without further input from user AA 120AA. Revenue generator A 110A may need to provide a contact phone number during the set-up process to enable "click to call" action 705. Alternatively, a "click to call" action 705 may submit the phone number of user AA 120AA to the revenue generator A 110A for later callback from the revenue generator A 110A. Revenue generator A 110A may provide several phone numbers to correspond with its various locations.

Another mobile action may include a "click to message" action 710. Clicking a "click to message" action 710 allows user AA 120AA to send a message directly to the contact phone number or email of revenue generator A 110A. The message may be any of the available messaging systems such as short message service (SMS) or Multimedia Messaging Service (MMS). Additionally, the message may be sent from the email account of user AA 120AA. The message may be any message such as a question or response to the advertisement from the user AA 120AA to the revenue generator A 110A. The message may also be a message with an integrated picture, sound, or file that the user AA 120AA wishes to provide to the revenue generator A 110A. Revenue generator A 110A may need to provide a phone number, email address, or other contact information to receive the message from user AA 120AA.

Another mobile action may include a "click to chat" action 720. Clicking a "click to chat" action 720 allows user AA 120AA to initiate a chat session, such as a text chat, with revenue generator A 110A or another designated chattee. The chat may be conducted via a chat room, an instant messaging service, or any other available chat service. Revenue generator A 110A may need to provide a contact chat service name such as for example its user name for YAHOO! MESSENGER. If the mobile device of user AA 120AA has video transmission capability, the video transmission may be integrated with the "click to chat" action 720.

Another mobile advertisement action may include a "click to location" action 730. A revenue generator A 110A wishing to direct a user AA 120AA to a physical location may communicate its location or locations to the service provider 130. Clicking a "click to location" action 730 allows the user AA 120AA to be directed via a map, audio commands, text commands, or email directions, to the location provided by revenue generator A 110A. Where the location of user AA 120AA is known from a positioning system locator, an IP address, a pre-set location, a user-provided location, a cell phone tower address, or other means, directions directly from the location of the user AA 120AA may also be provided. If a revenue generator A 110A has more than one designated physical location, the location most proximal to the location of user AA 120AA, or a pre-determined location, may be provided. A user AA 120AA may also select which location of revenue generator A 110A they are interested in when they select a "click to call" action 730.

Another mobile advertisement action may include a "click to coupon" action 740. Clicking a "click to coupon" action 740 allows user AA 120AA to obtain a coupon or discount to the business of the revenue generator A 110A. The revenue generator A 110A may provide the information for the coupons or discounts during the set-up process and/or update this information at a later time. The revenue generator A 110A may change the coupons daily, weekly, or at any other selected time intervals. After clicking the "click to coupon" action 740 the coupon may be communicated to user AA 120AA via SMS, MMS, email, or any other method of communication. The coupons provided to user AA 120AA may be static and pre-selected by revenue generator A 110A before the user AA 120AA submits any search requests. Alternatively, the coupons may be dynamically selected and may be selected based on submitted user or request parameters.

Another mobile advertisement action may include a "click to download" action 750. Clicking a "click to download" action 750 allows the user AA 120AA to download information or programs provided by revenue generator A 110A and communicated by service provider 130. A service provider 130 may, for example, provide a downloadable menu to a restaurant, a ringtone, a software program, or any other downloadable item. The user AA 120AA may then download these items by clicking on the "click to download" action 750 that is displayed as part of an advertisement.

Another mobile advertisement action may include a "click to make reservation" action 760. A revenue generator A 110A may provide information allowing the user AA 120AA to make a reservation at its business. For example, if revenue generator A 110A is a restaurant, the user AA 120AA may submit a reservation for dinner via a "click to make reservation" action 760. In one instance a "click to make reservation" action 760 may be integrated with the "click to call" action 705, so that the call is directed to the reservation section of the restaurant. In another instance a "click to make reservation" action 760 may be integrated with a "click to message" action 710, so that the user AA 120AA sends a message to the restaurant with the number of people or time of arrival to the restaurant. The "click to make reservation" action 760 can be integrated with various other call actions.

Another mobile advertisement action may include a "click to survey" action 770. A revenue generator A 110A may provide a survey to user AA 120AA. Clicking the "click to survey" action 770 may direct the user AA 120AA to a mobile webpage with a survey. Alternatively or in addition the survey may be delivered to user AA 120AA via an SMS or series of SMS, or through an associated email address. Alternatively or in addition the user AA 120AA may be directed to the phone number associated with the survey and may conduct the survey over voice communications. In this way, a "click to survey" action 770 may function similarly to a "click to call" action 705.

Another mobile advertisement action may include a "click to purchase" action 780. A revenue generator A 110A may put an image, description, video, or audio of a product into the advertisement. Clicking a "click to purchase" action 780 may take the user AA 120AA directly to a checkout page for the revenue generator A 110A, without the need to click any other links. A user AA 120AA may pre-submit their credit card information and address to MNO A 115A or service provider 130 or revenue generator A 110A, allowing the "click to purchase" action 780 to act as an instant checkout feature from the revenue generator A 110A.

Another mobile advertisement action may include an "email marketing" action 790. A revenue generator A 110A may provide email marketing materials that are delivered to the email of user AA 120AA on the activation of the "email marketing" action 790. Marketing materials may include newsletters, product information, lists or any other relevant materials.

These mobile advertisement actions are only several of those that are available with the integration of system 100. These descriptions are non-limiting and non-exhaustive and are meant to describe only some of the available possibilities of system 100.

Figure 8:
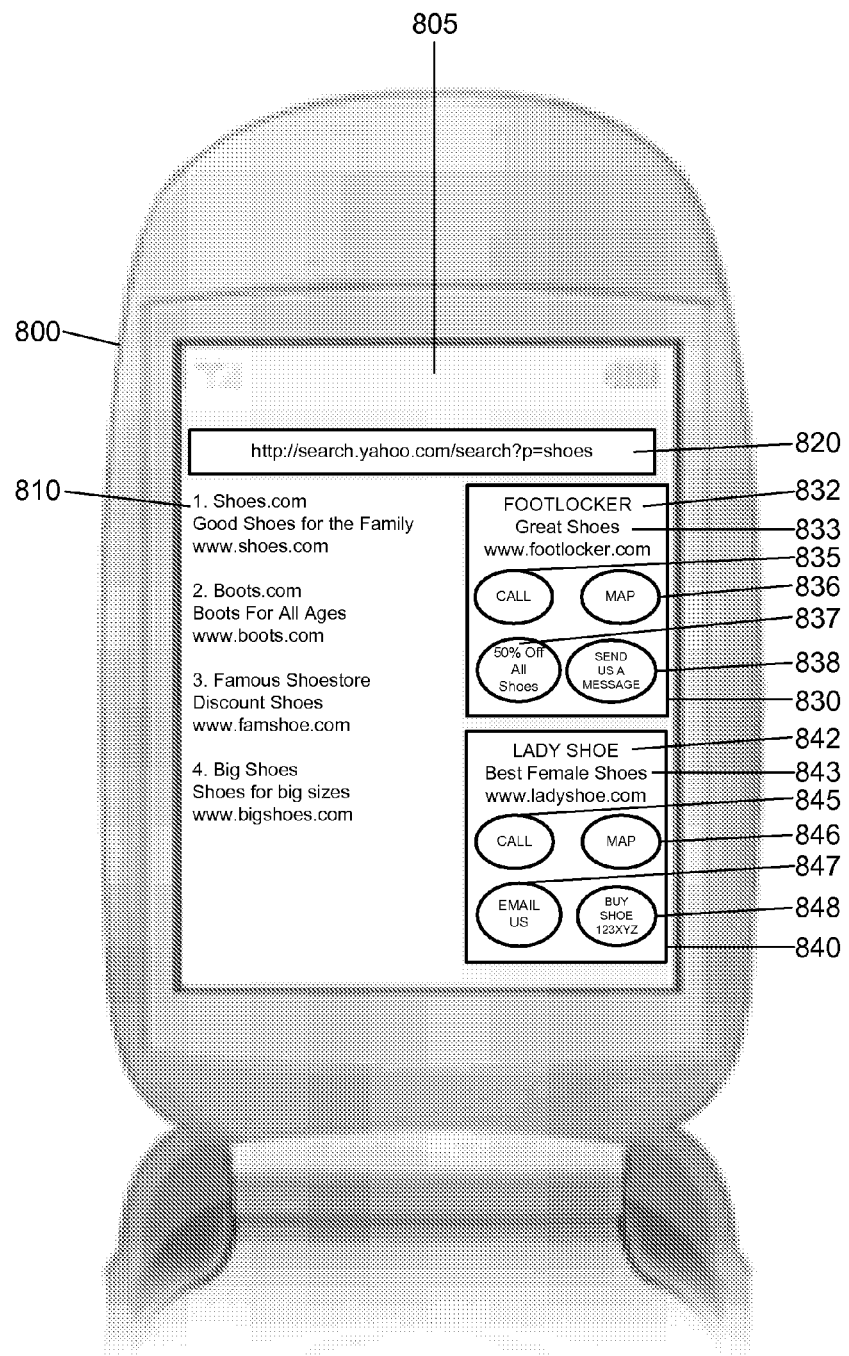
FIG. 8 is an illustration of an exemplary mobile device displaying a mobile web page containing advertisements with mobile advertisement actions.

FIG. 8 is an illustration 800 of an exemplary mobile device used in the systems of FIG. 1 and FIG. 2, or other systems for providing mobile advertisement actions. The mobile web page 805 contains advertisements 830, 840 with mobile advertisement actions 835, 836, 837, 838, 845, 846, 847, 848. User AA 120AA may submit a search request to a search engine such as by typing a search term into a field on the webpage 805. In this example, the user AA 120AA submits the keyword "shoes" via a mobile web search engine. The system 100 communicates the search results 810 to the mobile application 220AA of user AA 120AA. The search results 810 are displayed to the mobile device via the mobile webpage 805. The webpage 805 may contain the web address of the resulting search page 820. System 100 may also communicate the mobile advertisements 830, 840 of one or more of the revenue generators 110A-N, such as the revenue generator A 1110A. The mobile advertisement 830 may include a mobile call action 835, a mobile mapping action 836, a mobile coupon action 837 and a mobile messaging action 838. The mobile advertisement 840 may include a mobile call action 845, a mobile mapping action 846, a mobile email action 847 and a mobile purchase action 848. Other mobile advertisement actions are possible and can be created to accommodate the needs of revenue generator A 110A.

Figure 10:
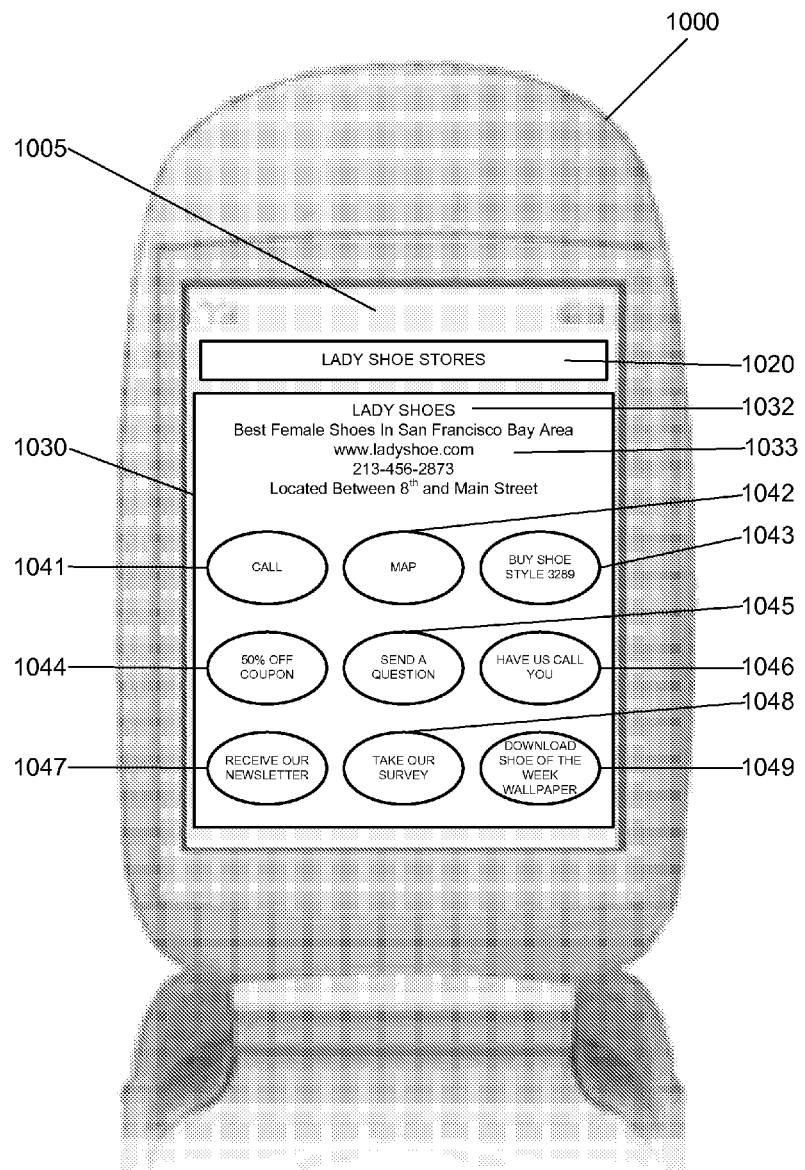
FIG. 10 is an illustration of an exemplary mobile device displaying an offer landing page including an advertisement with mobile advertisement actions.

The mobile advertisements 830, 840 and the mobile advertisement actions 835, 836, 837, 838, 845, 846, 847, 848 may be targeted to the keyword searched for by the user AA 120AA. Other call actions may include sending the revenue generator A 110A a message, such as an instant message, or providing a direct link to discounted merchandise or a coupon of the revenue generator or others. The advertisements 830, 840 may have a title 832, 842 and short description 833, 843 explaining the advertisement. Title 832, 842 may be clickable and direct the user to a web page or a mobile landing page of the revenue generator A 110A as explained earlier. Mobile advertisement actions 835, 836, 837, 838, 845, 846, 847, 848 may be clickable directly from the mobile webpage 805 without clicking on any intermediary webpages. Clicking any of the mobile advertisement actions 835, 836, 837, 838, 845, 846, 847, 848 may cause the mobile device of the user AA 120AA to execute the functionality of the mobile advertisement action. Alternatively, clicking on the titles 832, 842 or any area of the advertisements 830, 840 other than the mobile advertisement actions 835, 836, 837, 838, 845, 846, 847, 848 may directs the user AA 120AA to a new webpage where the advertisement is enlarged and displayed by itself on the screen of the mobile device, as shown in FIG. 10. Alternatively, clicking on the titles 832, 842 or any area of the advertisements 830, 840 other than the mobile advertisement actions 835, 836, 837, 838, 845, 846, 847, 848 may direct the user AA 120AA to a mobile web page of the revenue generator A 110A.

Revenue generator A 110A may choose which of the mobile advertisement actions 705, 710, 720, 730, 740, 750, 760, 770, 780, 790 are displayed in the advertisements 830, 840. Alternatively, the mobile advertisement actions 835, 836, 837, 838, 845, 846, 847, 848 may be dynamically selected based on submitted user and request parameters. Two different mobile advertisements 830, 840 may therefore have different mobile advertisement actions associated with them as shown in FIG. 8.

Figure 9:
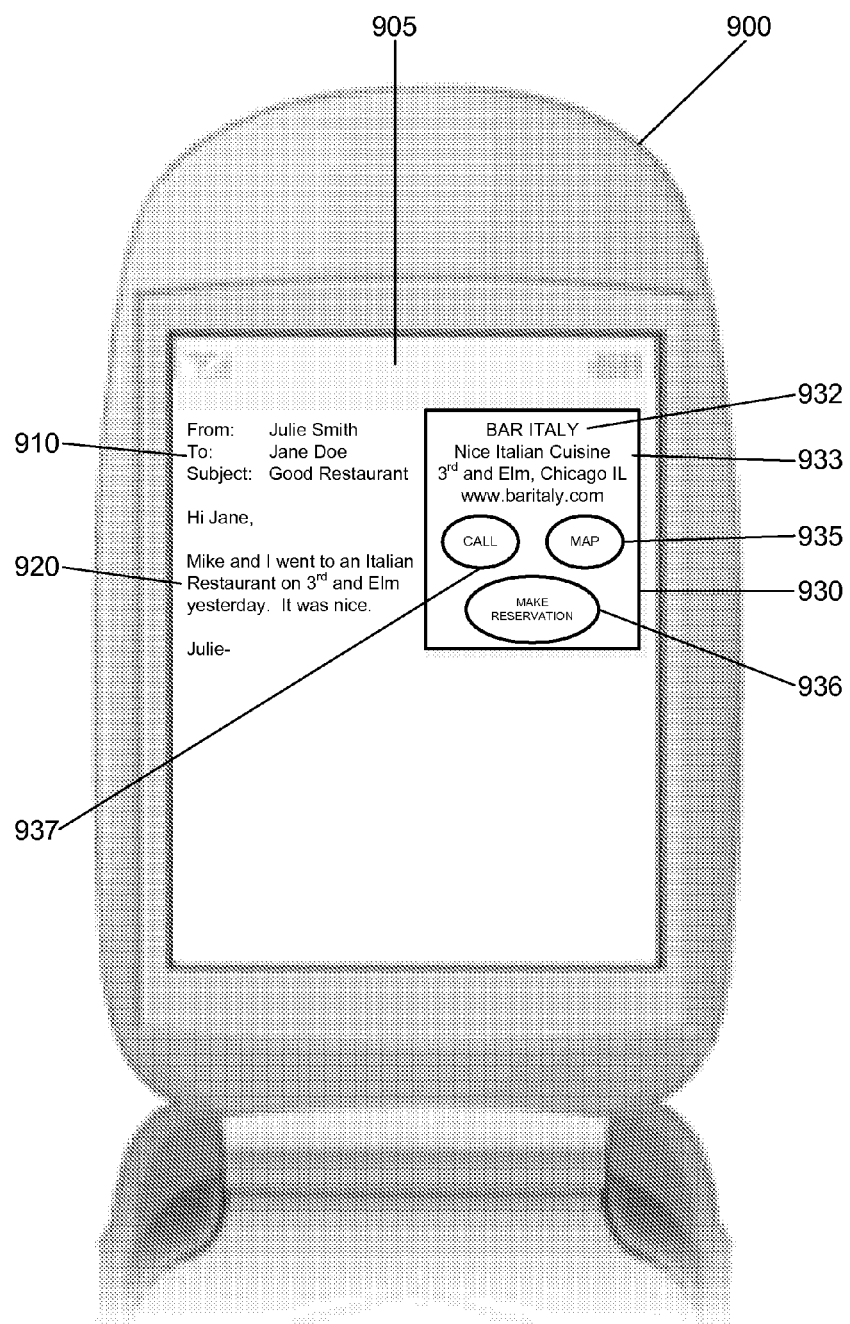
FIG. 9 is an illustration of an exemplary mobile device displaying an email message containing an advertisement with mobile advertisement actions.

FIG. 9 is an illustration 900 of an exemplary mobile device displaying an email message 905. The email message 905 may have a header line 910, a message line 920, and may contain one or more mobile advertisements 930 with a mobile call action 937, a mobile mapping action 935, and a mobile reservation action 936. Other mobile advertisement actions may also be included, such as the mobile advertisement actions 605, 610, 620, 630, 640, 650, 660, 670, 680, 690 described in FIG. 6. Mobile applications 220AA-NN may receive and process emails. Advertisements may be selected and delivered via email similar to their selection and delivery through a mobile Web search. For example, service provider 130 may automatically content match email text 920 or header text 910 with keywords. The resulting targeted advertisement 930 with mobile advertisement actions 935, 936, 937. The mobile advertisement actions 935, 936, 937 associated with the advertisement 930 are clickable and allow a user AA 120AA to click on any of the mobile actions 935, 936, 937 if they are interested in the advertisement 930.

Additionally, an advertisement 930 with mobile advertisement actions 935, 936, 937 displayed in the email 905 may have several advantages. For example, it may allow a user AA 120AA to utilize mobile advertisement actions 935, 936, 937 without having to connect to the Internet. This may be advantageous for users 120AA-NN who download their email at one time period, but want to click on mobile advertisement actions 935, 936, 937 when they do not have, or want, Internet access. For example, the mobile call action 937 may have the phone number of the revenue generator A 110A delivered with the email. A user AA 120AA clicking on the mobile call action 936 may thus connect directly to the revenue generator A 110A without being connected to the Internet. Additional or alternative call actions may be included such as a call action to receive a follow-up call from a revenue generator A 110A or a call action to submit a packet of information.

FIG. 10 is an illustration 1000 of a mobile device displaying a mobile landing page 1005 for a mobile advertisement 1030 of a revenue generator A 110A. The mobile advertisement 1030 may include a title 1032, a description 1033, a mobile call action 1041, a mobile mapping action 1042, a mobile purchase action 1043, a mobile coupon action 1044, a mobile question action 1045, a mobile call action 1046, a mobile receive action 1047, a mobile survey action 1048, and a mobile download action 1049. The mobile advertisement actions 1041, 1042, 1043, 1044, 1045, 1046, 1047, 1048, 1049 may be any of the mobile advertisement actions 705, 710, 720, 730, 740, 750, 760, 770, 780, 790 or other mobile advertisement actions. The mobile landing page 1005 may provide additional information 1020 about the revenue generator A 110A, such as a description of the revenue generator, a website, a telephone number and/or an address. Each mobile advertisement action 1041, 1042, 1043, 1044, 1045, 1046, 1047, 1048, 1049 to be displayed may be individually selected by revenue generator A 110A and may be changed dynamically to match a search keyword. Alternatively, it may be selected by the service provider 130. Because of the increased screen space allocated to the advertisement, more mobile advertisement actions 1041, 1042, 1043, 1044, 1045, 1046, 1047, 1048, 1049 may be displayed in the advertisement 1030 than if less space was included, such as in the mobile advertisement 930. The mobile call actions 1041, 1042, 1043, 1044, 1045, 1046, 1047, 1048, 1049 may provide the user AA 120AA with the actions of receiving coupons, sending questions to the revenue generator, having the revenue generator A 110A call the user AA 120AA or another, requesting to receive a newsletter, taking a survey of the revenue generator, and downloading wallpaper or other information to display.

The service provider 130 may provide the mobile landing page 1005 to the user AA 120AA if the user AA 120AA clicks on the advertisement 840 without clicking on one of the mobile advertisement actions 845, 846, 846, 848. On the mobile landing page 1005 more mobile actions may be displayed to the user AA 120AA than may be displayed on the mobile search page 805. Additionally, information describing the revenue generator A 110A, such as the homepage address, phone number, and logo may continue to be displayed. Alternatively or in addition clicking on the mobile advertisement 840 may direct the user AA 120AA to the homepage of the revenue generator A 110A.

FIG. 11 illustrates a general computer system 1100, which may represent a service provider server 240, a third party server 250, an advertising services server 260, a mobile device or any of the other computing devices referenced herein. The computer system 1100 may include a set of instructions 1124 that may be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1124 (sequential or otherwise) that specify actions to be taken by that machine. In a particular embodiment, the computer system 1100 may be implemented using electronic devices that provide voice, video or data communication. Further, while a single computer system 1100 may be illustrated, the term "system" shall also be taken to include any collection of systems or subsystems that individually or jointly execute a set, or multiple sets, of instructions to perform one or more computer functions.

As illustrated in FIG. 11, the computer system 1100 may include a processor 1102, such as, a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1104 may include a cache or random access memory for the processor 11102. Alternatively or in addition, the memory 1104 may be separate from the processor 1102, such as a cache memory of a processor, the system memory, or other memory. The memory 1104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1104 may be operable to store instructions 1124 executable by the processor 1102. The functions, acts or tasks illustrated in the figures or described herein may be performed by the programmed processor 1102 executing the instructions 1124 stored in the memory 1104. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1100 may further include a display 1114, such as a liquid crystal display (LCD), an organic light emitting diode (OLED), a flat panel display, a solid state display, a cathode ray tube (CRT), a projector, a printer or other now known or later developed display device for outputting determined information. The display 1114 may act as an interface for the user to see the functioning of the processor 1102, or specifically as an interface with the software stored in the memory 1104 or in the drive unit 1106.

Additionally, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the system 1100.

The computer system 1100 may also include a disk or optical drive unit 1106. The disk drive unit 1106 may include a computer-readable medium 1122 in which one or more sets of instructions 1124, e.g. software, can be embedded. Further, the instructions 1124 may perform one or more of the methods or logic as described herein. The instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium 1122 that includes instructions 1124 or receives and executes instructions 1124 responsive to a propagated signal; so that a device connected to a network 235 may communicate voice, video, audio, images or any other data over the network 235. The instructions 1124 may be implemented with hardware, software and/or firmware, or any combination thereof. Further, the instructions 1124 may be transmitted or received over the network 235 via a communication interface 1118. The communication interface 1118 may be a part of the processor 1102 or may be a separate component. The communication interface 1118 may be created in software or may be a physical connection in hardware. The communication interface 1118 may be configured to connect with a network 235, external media, the display 1114, or any other components in system 1100, or combinations thereof. The connection with the network 235 may be a physical connection, such as a wired Ethernet connection or may be established wirelessly as discussed below. Likewise, the additional connections with other components of the system 1100 may be physical connections or may be established wirelessly. In the case of a service provider server 240, a third party server 250, an advertising services server 260, the servers may communicate with users 120AA-NN and the revenue generators 110A-N through the communication interface 1118.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1122 may be a single medium, or the computer-readable medium 1122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1122 may include a solid-state memory such as a memory card or other package that houses one or more non-volatile read-only memories. The computer-readable medium 1122 also may be a random access memory or other volatile re-writable memory. Additionally, the computer-readable medium 1122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for providing a mobile advertisement including mobile advertisement actions, comprising:

receiving, with a processor of an advertising service provider, a request from a cellular device, the cellular device being in communication with a cellular carrier of a plurality of cellular carriers, the received request including information about a geographic location of the cellular device;

determining, with the processor, an identity of the cellular carrier in communication with the cellular device, the processor of the advertising service provider being in communication with the plurality of cellular carriers for providing advertisements to respective cellular devices which are in communication with respective cellular carriers of the plurality of cellular carriers, a provision of advertisements being based at least in part on an identity of a respective cellular carrier;

identifying, with the processor, a mobile advertisement targeted to both the request and the cellular carrier based on the geographic location of the cellular device;

identifying, with the processor, a cellular call action associated with the identified mobile advertisement and targeted to the geographic location of the cellular device, the cellular call action having a function of causing the cellular device to perform a telephone call to a phone number associated with the identified mobile advertisement when activated by a user of the cellular device;

appending, with the processor, the cellular call action to the mobile advertisement by including a link or button in the identified mobile advertisement when the identified mobile advertisement is displayed on the cellular device; and providing, with the processor, the identified mobile advertisement with the appended cellular call action to the cellular device.

2. The method of claim 1 wherein the request is a request to perform a search based on a keyword.

3. The method of claim 2 wherein the identified mobile advertisement and the cellular call action are targeted to the keyword.

4. The method of claim 1 wherein the request comprises a mobile message.

5. The method of claim 1 wherein the request comprises a voice communication.

6. A system for providing mobile advertisement actions, comprising:

a memory to store a request, cellular carrier data, mobile advertisement data, and cellular call action data;

an interface operatively connected to the memory to communicate with a cellular device; and a processor operatively connected to the memory and the interface, the processor being configured to:

receive information of the cellular device and a request from the cellular device via the interface, the cellular device being in communication with a cellular carrier of a plurality of cellular carriers, the received information including geographic location information of the cellular device, determine cellular carrier data relating to an identity of the cellular carrier in communication with the cellular device, the processor being in communication with the plurality of cellular carriers for providing advertisements to respective cellular devices which are in communication with respective cellular carriers of the plurality of cellular carriers, a provision of the advertisements being based at least in part on the identity of a respective cellular carrier, identify mobile advertisement data and cellular call action data targeted to both the request and the cellular carrier data based on the geographic location information of the cellular device, wherein the cellular call action data has a function of causing the cellular device to perform a telephone call to a phone number associated with a mobile advertisement defined by the identified mobile advertisement data, append the cellular call action data to the mobile advertisement data by including a link or button in the mobile advertisement when the mobile advertisement is displayed on the cellular device, and communicate the mobile advertisement data with the appended cellular call action data to the cellular device via the interface.

7. The system of claim 6 wherein the request is a request to search for a keyword.

8. The method of claim 7 wherein the processor is further configured to perform the search requested and communicate a set of search results, mobile advertisement data, and the cellular call action to the cellular device via the interface.

9. The system of claim 6 wherein the information received by the processor further comprises user data about a user of the cellular device.

10. The system of claim 6 wherein the cellular device comprises a mobile phone.

11. The system of claim 6 wherein the interface is configured to communicate to the cellular device via the cellular carrier.

12. A non-transitory computer-readable storage medium comprising a set of instructions for providing a mobile advertisement including a mobile advertisement action, the set of instructions to direct a processor of an advertising service provider to perform acts of:

receiving a request from a cellular device, the cellular device being in communication with a cellular carrier of a plurality of cellular carriers, the request including information about a geographic location of the cellular device;

determining an identity of the cellular carrier in communication with the cellular device, wherein the processor of the advertising service provider is in communication with the plurality of cellular carriers for providing advertisements to respective cellular devices which are in communication with respective cellular carriers of the plurality of cellular carriers, a provision of advertisements being based at least in part on an identity of a respective cellular carrier;

identifying a mobile advertisement targeted to both the request and the cellular carrier based on the geographic location of the cellular device;

identifying a cellular call action associated with the identified mobile advertisement and targeted to the geographic location of the cellular device, the cellular call action having a function of causing the cellular device to perform a telephone call to a phone number associated with the identified mobile advertisement when activated by a user of the cellular device;

appending the cellular call action to the mobile advertisement by including a link or button in the identified mobile advertisement when the identified mobile advertisement is displayed on the cellular device; and providing the identified mobile advertisement with the appended cellular call action to the cellular device.

13. The non-transitory computer-readable storage medium of claim 12, wherein the request is a request to perform a search based on a keyword.

14. The non-transitory computer-readable storage medium of claim 13, wherein the identified mobile advertisement and the cellular call action are targeted to the keyword.

* * * * *